US012151658B2

United States Patent
Masuda

(10) Patent No.: US 12,151,658 B2
(45) Date of Patent: Nov. 26, 2024

(54) ELECTRIC BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 346 days.

(21) Appl. No.: 17/553,922

(22) Filed: Dec. 17, 2021

(65) Prior Publication Data

US 2022/0105919 A1   Apr. 7, 2022

Related U.S. Application Data

(63) Continuation of application No. PCT/JP2020/023299, filed on Jun. 12, 2020.

(30) Foreign Application Priority Data

Jun. 21, 2019 (JP) ................ 2019-115520

(51) Int. Cl.
*B60T 13/74* (2006.01)
*B60T 1/06* (2006.01)
*B60T 8/172* (2006.01)

(52) U.S. Cl.
CPC ............ *B60T 13/741* (2013.01); *B60T 1/065* (2013.01); *B60T 8/172* (2013.01); *B60T 2201/10* (2013.01)

(58) Field of Classification Search
None
See application file for complete search history.

(56) References Cited

U.S. PATENT DOCUMENTS 7,597,407 B2 * 10/2009 Yamaguchi ........... B60T 13/746
188/162
7,810,616 B2   10/2010 Nakazeki
(Continued)

FOREIGN PATENT DOCUMENTS

CN    101660580 A    3/2010
CN    105531166 A    4/2016
(Continued)

OTHER PUBLICATIONS

International Search Report for International Patent Application No. PCT/JP2020/023299 dated Aug. 18, 2020.
(Continued)

*Primary Examiner* — Angela Y Ortiz
*Assistant Examiner* — Torrence S Marunda, II

(57) ABSTRACT

A controller of an electric brake device includes first, second and third PKB operators. Upon receipt of an instruction to produce a parking brake active state while a parking brake is released, the first PKB operator exerts a braking force without depending on a brake pedal and determines if a desired braking force is exerted. After the determination by the first PKB operator, the second PKB operator makes a movable part ready to come into engagement with an engaged part and causes an electric motor to rotate in a direction in which the braking force is decreased, so that the movable part comes into engagement with the engaged part to prevent the rotation of the electric motor. Then, the third PKB operator produces the parking brake active state where no driving power is generated to the electric motor.

6 Claims, 13 Drawing Sheets

(56) References Cited

U.S. PATENT DOCUMENTS

| | | | |
|---|---|---|---|
| 7,828,124 B2 * | 11/2010 | Sano | B60T 8/885 188/162 |
| 9,387,837 B2 * | 7/2016 | Yokoyama | B60T 13/588 |
| 9,605,722 B2 | 3/2017 | Saoyama et al. | |
| 9,855,934 B2 | 1/2018 | Yasui | |
| 10,151,364 B2 | 12/2018 | Miebach et al. | |
| 10,343,667 B2 * | 7/2019 | Tsukamoto | F16D 65/18 |
| 10,391,985 B2 | 8/2019 | Misumi et al. | |
| 10,442,413 B2 | 10/2019 | Tanaka et al. | |
| 10,634,202 B2 | 4/2020 | Saoyama | |
| 10,752,229 B2 * | 8/2020 | Yasui | B60T 1/062 |
| 2008/0110704 A1 | 5/2008 | Nakazeki | |
| 2010/0051395 A1 | 3/2010 | Sano et al. | |
| 2015/0219172 A1 | 8/2015 | Saoyama et al. | |
| 2016/0244035 A1 | 8/2016 | Yasui | |
| 2017/0343067 A1 | 11/2017 | Miebach et al. | |
| 2018/0017115 A1 | 1/2018 | Saoyama | |
| 2018/0072285 A1 | 3/2018 | Tanaka et al. | |
| 2018/0148022 A1 | 5/2018 | Misumi et al. | |
| 2018/0215369 A1 | 8/2018 | Tsukamoto | |

FOREIGN PATENT DOCUMENTS

| | | |
|---|---|---|
| CN | 107406065 A | 11/2017 |
| JP | 2006-183809 A | 7/2006 |
| JP | 2006-194356 A | 7/2006 |
| JP | 2008-265669 A | 11/2008 |
| JP | 2014-084968 A | 5/2014 |
| JP | 2016-000583 A | 1/2016 |
| JP | 2016-156454 A | 9/2016 |
| JP | 2017-211086 A | 11/2017 |
| JP | 2018-086868 A | 6/2018 |
| WO | WO 2016/114235 A1 | 7/2016 |

OTHER PUBLICATIONS

International Preliminary Reported on Patentability and Written Opinion for International Patent Application No. PCT/JP2020/023299 dated Dec. 30, 2021.

* cited by examiner

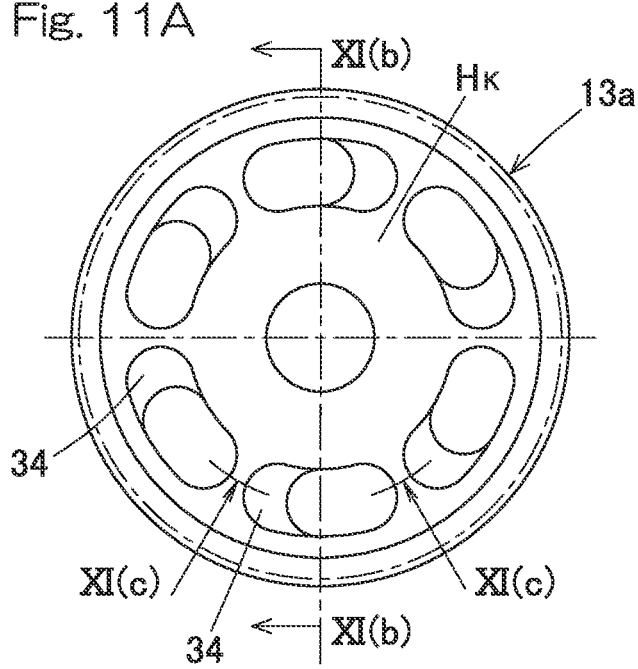
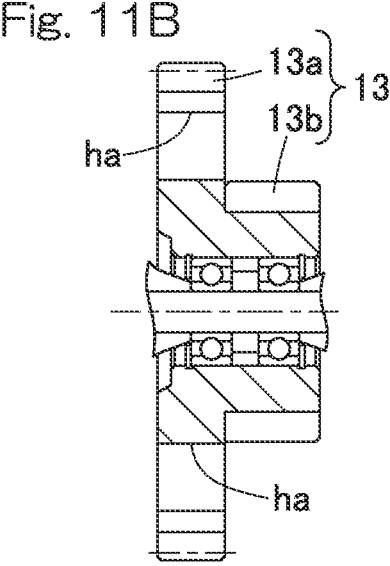
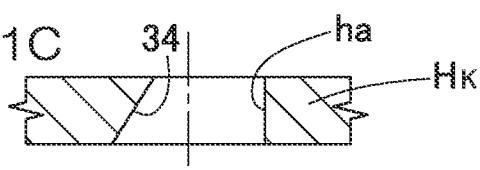
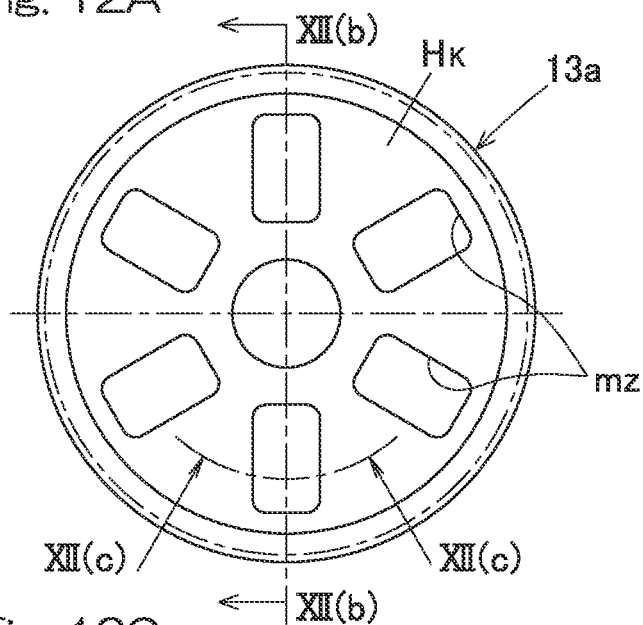
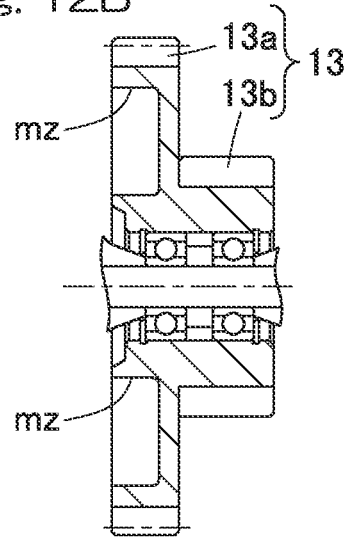
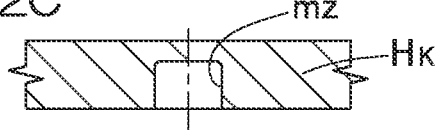

ELECTRIC BRAKE DEVICE

CROSS REFERENCE TO THE RELATED APPLICATION

This application is a continuation application, under 35 U.S.C. § 111(a), of international application No. PCT/JP2020/023299, filed Jun. 12, 2020, which claims priority to Japanese patent application No. 2019-115520, filed Jun. 21, 2019, the entire disclosures of all of which are herein incorporated by reference as a part of this application.

BACKGROUND OF THE INVENTION

Field of the Invention

The present invention relates to an electric brake device which is mounted in a vehicle or the like.

Description of Related Art

As electric brake devices, the following technologies have been proposed:
1. an electric brake with a parking brake function which includes a lock mechanism on an outer periphery of a ratchet (Patent Document 1),
2. an electric actuator including a planetary roller mechanism and an electric motor (Patent Document 2).

RELATED DOCUMENT

Patent Document

[Patent Document 1] JP Laid-open Patent Publication No. 2006-183809
[Patent Document 2] JP Laid-open Patent Publication No. 2006-194356

SUMMARY OF THE INVENTION

There are cases where electric actuators capable of being locked while a predetermined loaded state is maintained without using power of a motor are demanded, such as parking brakes of the electric brake devices as described in Patent Documents 1 and 2.

In such cases, in the electric actuator as described in Patent Document 1 which includes a reverse-input holding mechanism which functions by engagement of a movable part with a stationary part, it is often required to reliably make a state transition to/from a reverse-input holding state, such as when a shift is made to the reverse-input holding state or when the reverse-input holding state is ended. For example, in the case where the reverse-input holding mechanism is employed in a parking brake function part of the electric brake device including the electric actuator, failure in shifting to the reverse-input holding state (i.e., parking brake active state) may lead to a problem that a vehicle on e.g., an inclined road moves on the inclined road against the intention of an operator, and failure in releasing the parking brake may lead to a problem that the vehicle cannot start moving.

An object of the present invention is to provide an electric brake device capable of precisely performing a parking brake operation with reduced malfunction.

Hereinafter, for the sake of expediency, the present invention will be described with reference signs used in embodiments in order to facilitate understanding.

An electric brake device 1 according to the present invention includes: a brake rotor 8; a friction member 9 configured to come into contact with the brake rotor 8 to generate a braking force; an electric motor 4; a friction member operating unit 6 configured to operate the friction member 9 by the electric motor 4; and a controller 2 including a control calculator 23 configured to calculate an electric motor operation amount which is used to control the braking force such that the braking force follows a target braking force given from a brake commander Bp and a drive circuit 18 configured to drive the electric motor 4,
  wherein the electric brake device further includes:
  a parking brake 7 including an engaged part Hk configured to move in conjunction with rotation of the electric motor 4 and a movable part 15 configured to move to come into engagement with and disengagement from the engaged part Hk, the parking brake being configured to bring the movable part 15 into engagement with the engaged part Hk to prevent movement in conjunction with the rotation of the electric motor 4 and retain the braking force generated by contact between the brake rotor 8 and the friction member 9 without using a driving force of the electric motor 4; and
  a parking brake commander Ps configured to send, to the controller 2, an instruction to produce or not to produce a parking brake active state where a predetermined braking force is retained using the parking brake 7 without the braking force following a command value given from the brake commander Bp,
  the controller 2 includes a braking force estimator 21 configured to estimate the braking force and a motor motion estimator 22 configured to estimate an electric motor motion state including at least one of an angle of the electric motor 4, a differential/integral (differential or integral) value of the angle, and a motion amount which is equivalent to the angle or the differential/integral value of the angle, and
  the controller 2 includes:
  a first parking brake operator 24aa configured to, upon receipt of an instruction to produce the parking brake active state from the parking brake commander Ps while a parking brake is released and not in the parking brake active state, exert the braking force without depending on the brake commander Bp and determine if the braking force is exerted which exceeds a braking force to be exerted in the parking brake active state at least on the basis of the braking force estimator 21;
  a second parking brake operator 24ab configured to, after determination by the first parking brake operator 24aa, make the movable part 15 ready to come into engagement with the engaged part Hk and cause the electric motor 4 to rotate in a direction in which the braking force is decreased at least on the basis of the motor motion estimator 22, so that the movable part 15 comes into engagement with the engaged part Hk to prevent the rotation of the electric motor 4; and
  a third parking brake operator 24ac configured to, after execution of the second parking brake operator 24ab, produce the parking brake active state where no driving power is generated to the electric motor 4.

The predetermined braking force may be arbitrarily defined according to the design or the like. For example, a suitable braking force may be determined by one or both of testing and simulation and be defined as the predetermined braking force.

According to this constitution, while the parking brake is released, the controller 2 controls the braking force such that the braking force follows a target braking force given from the brake commander Bp.

Once the parking brake commander Ps sends an instruction to produce the parking brake active state to the controller 2, control is sequentially executed by the first parking brake operator 24*aa*, the second parking brake operator 24*ab*, and the third parking brake operator 24*ac*.

First, upon receipt of an instruction to produce the parking brake active state while the parking brake is released, the first parking brake operator 24*aa* exerts a braking force without depending on the brake commander Bp. The first parking brake operator 24*aa* further determines if the braking force is exerted which exceeds a braking force to be exerted in the parking brake active state.

After this determination, the second parking brake operator 24*ab* makes the movable part 15 ready to come into engagement with the engaged part Hk and causes the electric motor 4 to rotate in a direction in which the braking force is decreased. Thus, a so-called lock state is attained where the engaged part Hk and the movable part 15 are engaged with each other.

Then, the third parking brake operator 24*ac* produces the parking brake active state where no driving power is generated to the electric motor 4.

Thus, when shifting to the parking brake active state, an operation of exerting a braking force equivalent to the parking brake, an operation of locking the parking brake 7, and an operation of maintaining the parking brake active state while suppressing power consumption of the electric motor 4 are performed sequentially, so that the parking brake operation can be precisely performed with reduced malfunction.

The controller 2 may include:
a first parking brake releaser 24*ba* configured to, upon receipt of an instruction to end the parking brake active state from the parking brake commander Ps when in the parking brake active state, make the movable part 15 ready to be disengaged from the engaged part Hk and causes the electric motor 4 to rotate, from a state at a time of starting parking brake release, in a direction in which the braking force is increased at least on the basis of one or both of the braking force estimator 21 and the motor motion estimator 22, so that the electric motor 4 is rotated such that the movable part 15 can be disengaged; and
a second parking brake releaser 24*bb* configured to, after execution of the first parking brake releaser 24*ba*, cause the electric motor 4 to rotate at least on the basis of one or both of the braking force estimator 21 and the motor motion estimator 22 and determine that the parking brake release has been completed when a rotation amount of the electric motor 4 exceeds a predetermined amount.

The predetermined amount may be arbitrarily defined according to the design or the like. For example, a suitable amount may be determined by one or both of testing and simulation and be defined as the predetermined amount.

In this case, an operation of rotating the electric motor 4 in the load increase direction to disengage the movable part 15 from the engaged part Hk and an operation of decreasing the load to release the parking brake load are sequentially performed from the parking brake active state, so that the parking brake release operation can be precisely performed with reduced malfunction.

The controller 2 may be configured to, upon receipt of an instruction to end the parking brake active state from the parking brake commander Ps while the first parking brake operator 24*aa* is executed, control the braking force such that the braking force follows a target braking force given from the brake commander Bp, from a state where the braking force is exerted without depending on the brake commander Bp.

Since the movable part 15 is not engaged with the engaged part Hk while the first parking brake operator 24*aa* is executed, a smooth shift to the service brake can be made when the controller 2 receives an instruction to end the parking brake active state, so that appropriate measures can be taken even when the parking brake is suddenly released due to an operational error.

The controller 2 may have a function of estimating a disturbance torque acting on the electric motor 4 at least on the basis of the motor motion estimator 22, and
the controller 2 may be configured to determine that the rotation of the electric motor 4 is prevented by engagement of the parking brake 7 when the estimated disturbance torque is larger than a predetermined torque and acts in a direction corresponding to a brake load increase direction while the second parking brake operator 24*ab* is executed.

Thus, completion of the lock operation can be specifically determined.

The predetermined torque may be arbitrarily defined according to the design or the like. For example, a suitable torque may be determined by one or both of testing and simulation and be defined as the predetermined torque.

The controller 2 may have a function of estimating an electric current of the electric motor 4, and
the controller 2 may be configured to determine that the rotation of the electric motor 4 is prevented by engagement of the parking brake 7 when the estimated electric current is larger than a predetermined electric current and generates a torque in a direction corresponding to a brake load decrease direction while the second parking brake operator 24*ab* is executed.

Thus, completion of the lock operation can be specifically determined.

The predetermined current may be arbitrarily defined according to the design or the like. For example, a suitable current may be determined by one or both of testing and simulation and be defined as the predetermined current.

The engaged part Hk has an engagement pitch Pc which is set such that the engaged part Hk and the movable part 15 can come into a positional relation where the engaged part Hk and the movable part 15 can be engaged with each other every time the electric motor 4 rotates by a predetermined angle, and
the controller 2 may be configured to determine that the parking brake 7 has failed to attain engagement when the electric motor 4 has rotated more than the engagement pitch at least on the basis of the motor motion estimator 22 while the second parking brake operator 24*ab* is executed, and execute a first parking brake operation and a second parking brake operation one or more times again.

The predetermined angle may be arbitrarily defined according to the design or the like. For example, a suitable angle may be determined by one or both of testing and simulation and be defined as the predetermined angle.

For example, mainly where the parking brake is not used for a long period of time, the movable part 15 of the parking brake may sometimes have a reduced operation speed due to entry of grease or wear particles from surrounding members of the parking brake. It is possible to configure the process such that in such cases, the lock operation of the parking brake 7 is allowed to be retried up to a predetermined number of times, so that the reliability of the parking brake operation can be improved.

The controller 2 may be configured to determine if the rotation of the electric motor 4 is prevented by the parking brake 7 at least on the basis of the motor motion estimator 22 while the second parking brake releaser 24bb is executed, and to determine that the parking brake release has failed when the rotation of the electric motor 4 is prevented, and further execute the first parking brake releaser 24ba one or more times again.

It is possible to configure the process such that where the movable part 15 of the parking brake 7 has a reduced operation speed, the release operation (i.e., operation to release the lock) of the parking brake 7 is allowed to be retried up to a predetermined number of times, so that the reliability of the parking brake release operation can be improved.

The present invention encompasses any combination of at least two features disclosed in the claims and/or the specification and/or the drawings. In particular, any combination of two or more of the appended claims should be equally construed as included within the scope of the present invention.

BRIEF DESCRIPTION OF THE DRAWINGS

The present invention will be more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like or corresponding parts throughout the several views.

FIG. 11A shows another exemplary configuration of the engaged part;

FIG. 11B shows another exemplary configuration of the engaged part;

FIG. 11C shows another exemplary configuration of the engaged part;

FIG. 12A shows yet another exemplary configuration of the engaged part;

FIG. 12B shows yet another exemplary configuration of the engaged part;

FIG. 12C shows yet another exemplary configuration of the engaged part;

DESCRIPTION OF THE EMBODIMENTS

First Embodiment

An electric brake device according to an embodiment of the present invention will be described with reference to FIG. 1 to FIG. 9. The electric brake device may be, for example, mounted in a vehicle.

Figure 1:
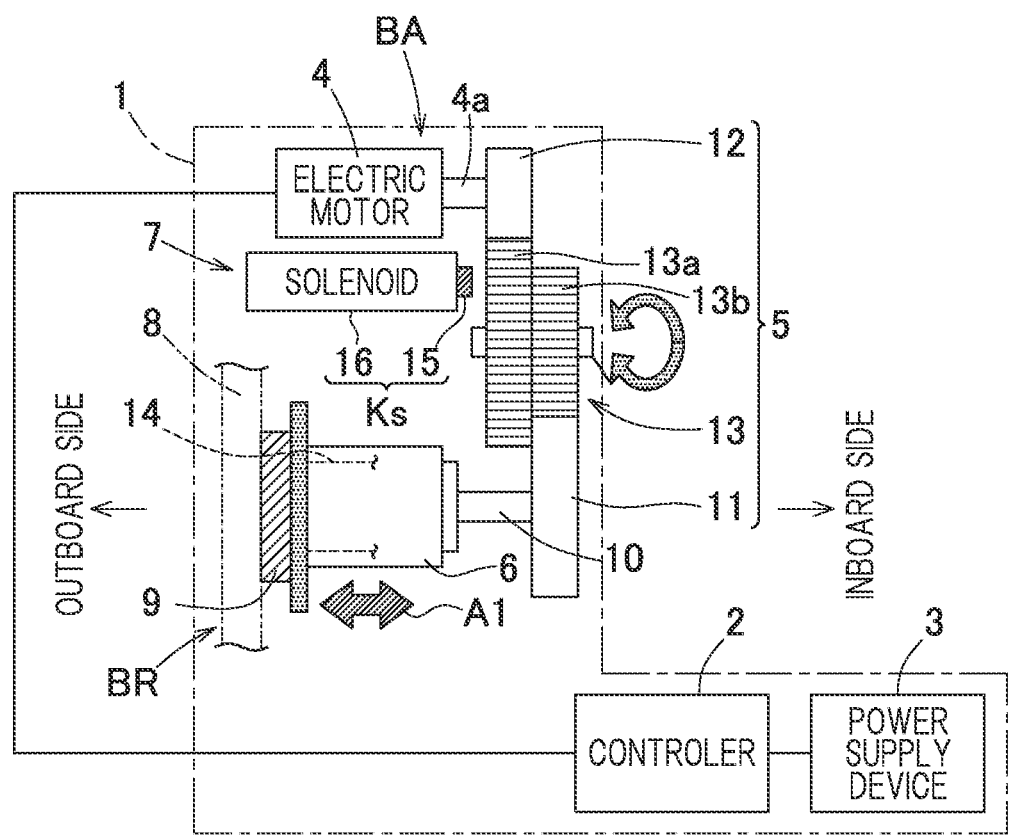
FIG. 1 schematically shows an electric brake device according to a first embodiment of the present invention.

As shown in FIG. 1, the electric brake device 1 includes a brake actuator BA, a power supply device 3, and a controller 2. First, the structure of the brake actuator BA will be described.

Exemplary Structure of Brake Actuator BA

Figure 4:
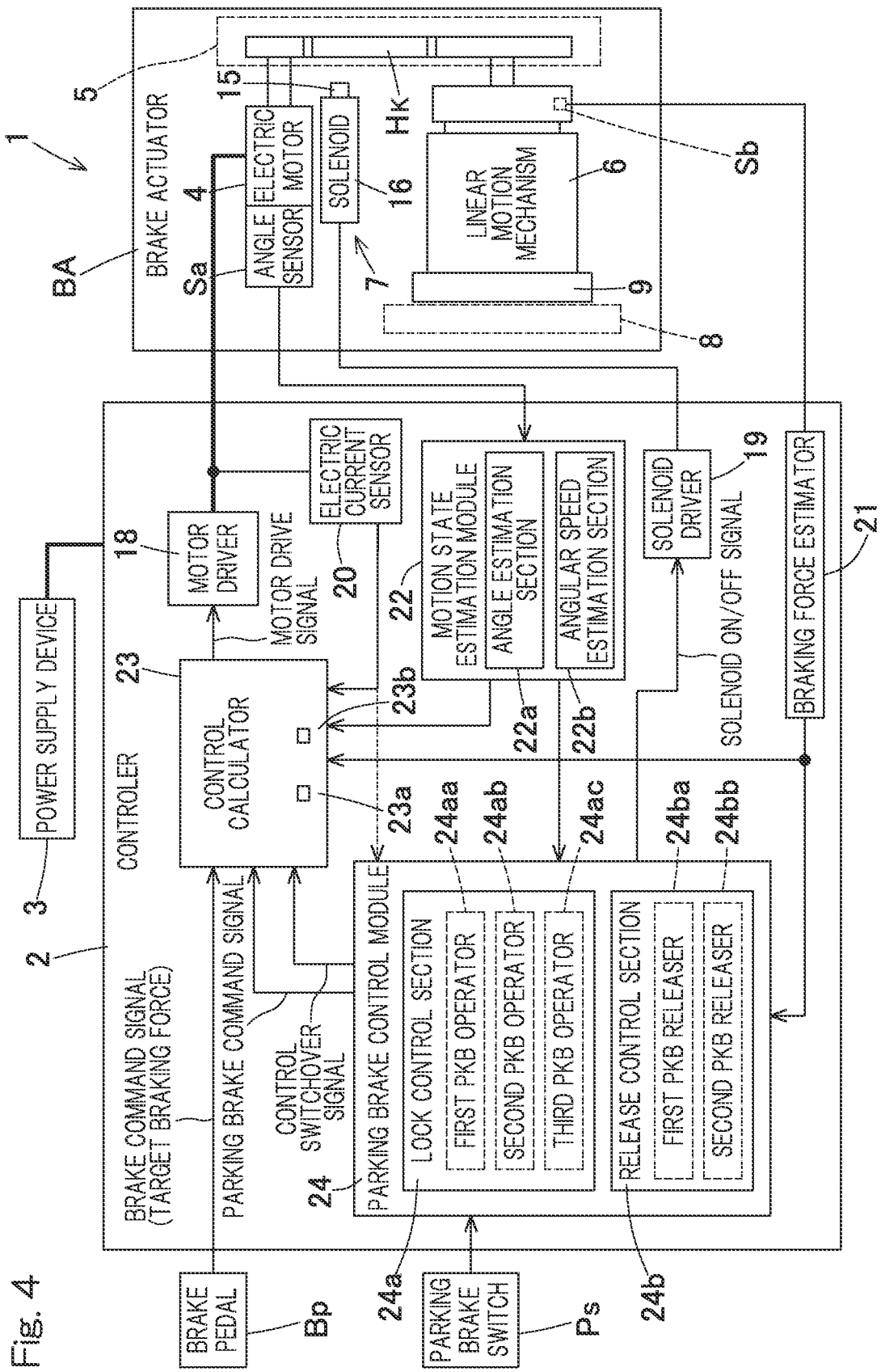
FIG. 4 is a block diagram of a control system of the electric brake device.

The brake actuator BA includes an electric motor 4, a linear motion mechanism 6, a speed reducer 5, a friction brake BR, a parking brake 7, an angle sensor Sa (FIG. 4), and a load sensor Sb (FIG. 4).

The electric motor 4 includes a rotor and a stator and may be, for example, a permanent magnet synchronous motor. Use of a permanent magnet synchronous motor as the electric motor 4 is preferable in terms of space saving, high efficiency and high torque.

The friction brake BR is provided to each wheel of a vehicle. The friction brake BR includes a brake rotor 8 which rotates in conjunction with a wheel, and a friction member 9 which comes into contact with the brake rotor 8 to generate a braking force. The friction member 9 can be operated by the linear motion mechanism 6, which is a friction member operating unit, such that the friction member is pressed against the brake rotor 8 to generate a pressure load by a friction force. In this example, the friction brake BR is a disc brake device including the brake rotor 8, which is a brake disc, and a non-illustrated caliper. Instead, the friction brake BR may be a drum brake device including a drum and a lining.

The speed reducer 5 is a mechanism for reducing a speed of rotation of the electric motor 4 and includes a primary gear 12, a middle gear 13 and a tertiary gear 11 each serving as a transmission part. In this example, the speed reducer 5 is a parallel gear system in which rotation of the primary gear 12 attached to a rotor shaft 4a of the electric motor 4 can be transmitted to the tertiary gear 11 fixed to an end portion of a rotation shaft 10, with the speed of the rotation reduced by first and second toothed parts 13a, 13b of the middle gear 13.

The linear motion mechanism 6 is a mechanism for converting rotary motion outputted by the speed reducer 5 into linear motion of a linear motion part 14 through a feed screw mechanism so as to bring the friction member 9 into contact with the brake rotor 8 and separate the friction member 9 from the brake rotor 8. The linear motion part 14 is provided in a nonrotatable manner and is supported so as to be movable in an axial direction indicated by arrow A1. The friction member 9 is arranged at an outboard side end of the linear motion part 14. The rotation of the electric motor 4 is transmitted to the linear motion mechanism 6 through the speed reducer 5, so that the rotary motion is converted into the linear motion which is in turn converted into a pressing force of the friction member 9 to generate a braking force. It should be noted that an "outboard side" refers to a side closer to an outside of a vehicle in a widthwise direction of the vehicle in which the electric brake device 1 is mounted, and an "inboard side" refers to a side closer to a center of the vehicle in the widthwise direction of the vehicle.

As shown in FIG. 4, the angle sensor Sa detects a rotation angle (motor angle) of the electric motor 4, which indicates a rotation amount of the electric motor 4. For example, the angle sensor Sa may preferably be a resolver or a magnetic encoder in terms of high precision and high reliability. Alternatively, the angle sensor Sa may be various sensors such as an optical encoder etc. Instead of using the angle sensor Sa, the controller 2 as described later may perform sensorless angle estimation for estimating a motor angle on the basis of a relation between voltage and electric current in the electric motor 4 or the like.

The load sensor Sb detects an axial load of the linear motion mechanism 6. For example, the load sensor Sb may preferably be a sensor for detecting e.g., strain or deformation corresponding to a load of the linear motion mechanism 6 in terms of low cost and high precision. The load sensor Sb may be a pressure-sensitive medium such as a piezoelectric element, or a torque sensor for detecting a braking torque of the brake rotor 8, or in a case where the electric brake device 1 is adapted for a vehicle, an acceleration sensor for detecting a deceleration in a front-rear direction of the vehicle. Alternatively, the controller 2 may perform sensorless estimation on the basis of a predetermined correlation such as a correlation between actuator rigidity and motor angle and a correlation between actuator load and motor torque, without employing a load sensor.

Exemplary Configuration of Parking Brake

Figure 2B:
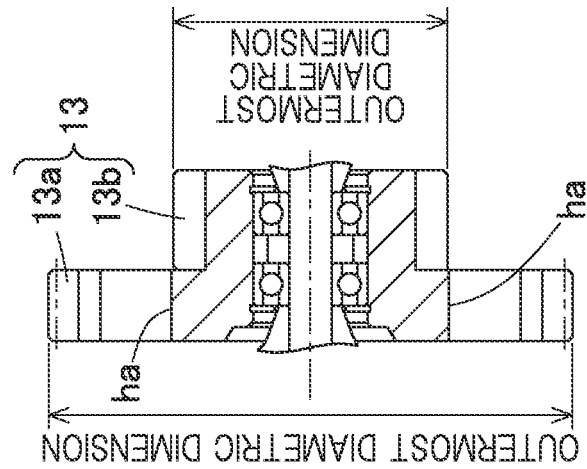
FIG. 2B shows an exemplary structure of an engaged part of a parking brake of the electric brake device.
Figure 2A:
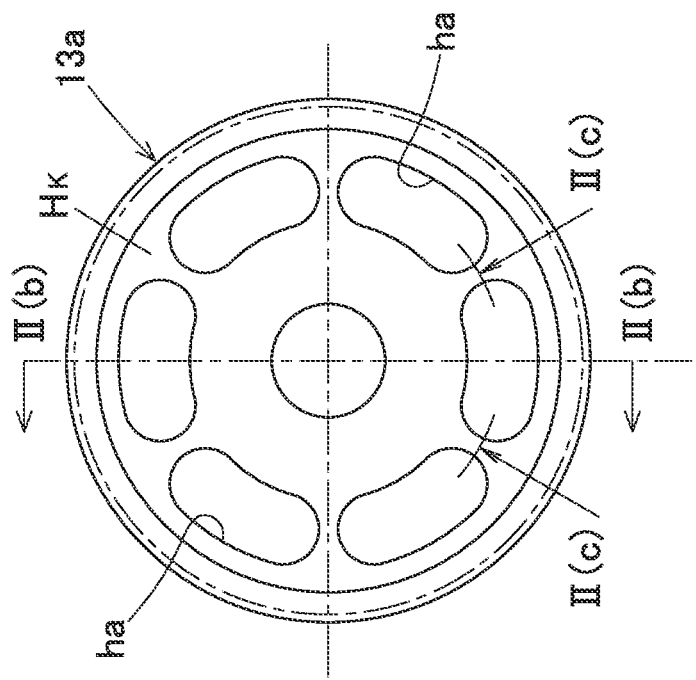
FIG. 2A shows an exemplary structure of an engaged part of a parking brake of the electric brake device.
Figure 2C:
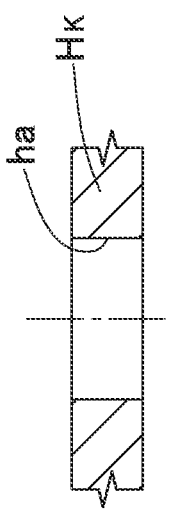
FIG. 2C shows an exemplary structure of an engaged part of a parking brake of the electric brake device.

As shown in FIG. 1 to FIG. 2C, the parking brake 7 is a mechanism for holding a braking force generated by contact between the brake rotor 8 and the friction member 9, without using a driving force of the electric motor 4. The parking brake 7 includes: an engaged part Hk which moves in conjunction with rotation of the electric motor 4; and a solenoid 16 which is a drive source for driving a movable part 15 such that the movable part 15 can be engaged with and disengaged from a hole ha of the engaged part Hk.

In this example, the engaged part Hk corresponds to the middle gear 13 of the speed reducer 5, and the middle gear 13 has an end face, in a direction of its rotation axis, which includes a plurality of (6, in this example) holes ha at equal intervals in a circumferential direction of the middle gear.

FIG. 2A is a front view of the middle gear 13; FIG. 2B is a cross-sectional view along line II(b)-II(b) in FIG. 2A; and FIG. 2C is a cross-sectional view along line II(c)-II(c) in FIG. 2A. As shown in FIG. 2A to FIG. 2C, each hole ha is a through hole which penetrates the middle gear 13 along an axial direction of the first toothed part 13a and is shaped as an elongated hole extending in arc-like manner over a predetermined length in the circumferential direction.

Figure 3:
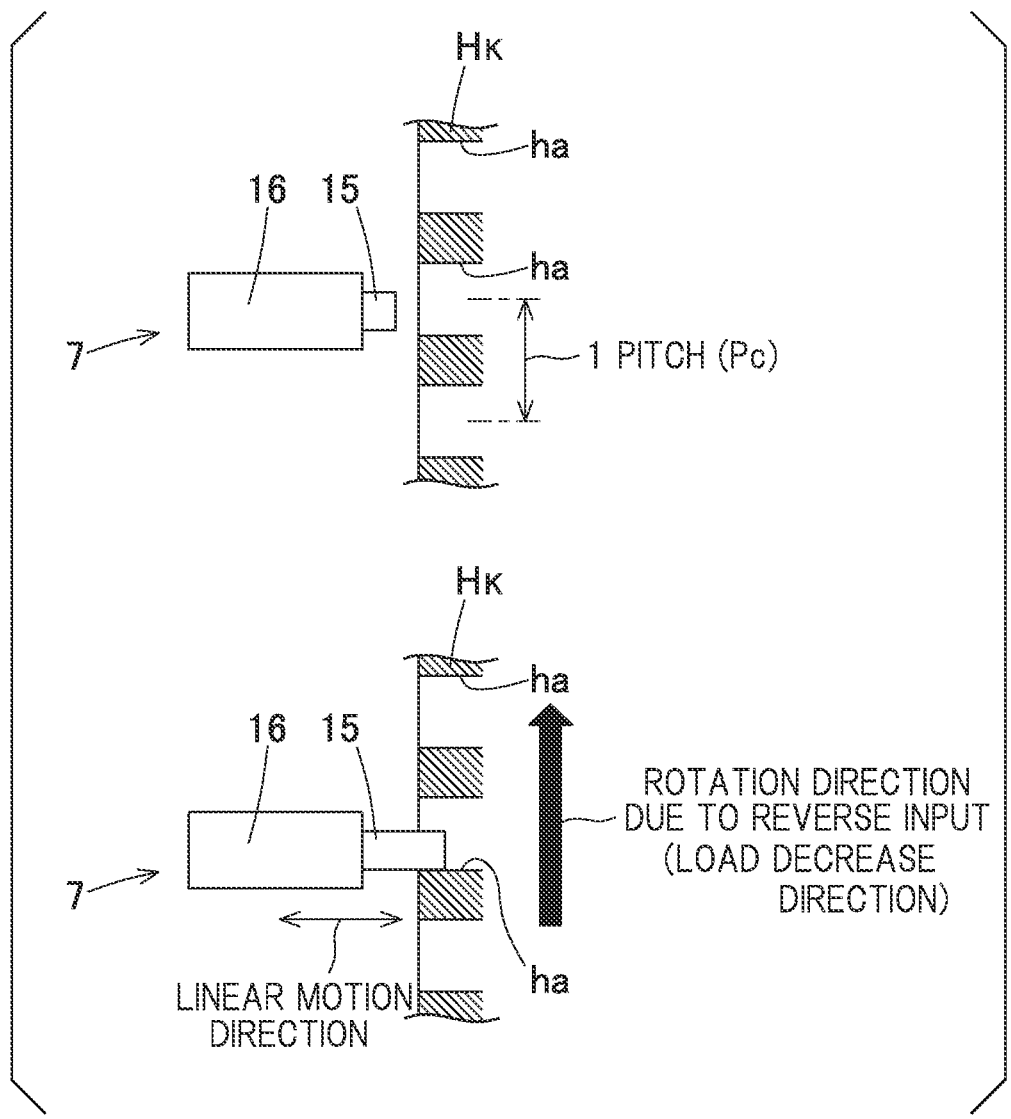
FIG. 3 schematically illustrates engagement/disengagement of a movable part with/from the engaged part.

As shown in FIG. 2A to FIG. 3, where this structure is employed to lock the parking brake 7, the movable part 15 in the form of a lock pin projects from the solenoid 16 which is held by a stationary system such as a housing and faces one of the holes ha, and comes into engagement with the one of the holes ha, so that rotation of the electric motor 4 (FIG. 1) is prevented, and the engagement is held by a fiction force at contact surfaces between the engaged part Hk and the movable part 15. Thus, a lock state of the parking brake 7 is maintained without using a driving force of the electric motor 4 (FIG. 1). An engagement pitch Pc is set such that the engaged part Hk and the movable part 15 can come into a positional relation where they can be engaged with each other every time the electric motor 4 (FIG. 1) rotates by a predetermined angle.

As shown in FIG. 1 to FIG. 2C, the solenoid 16 generates an excitation magnetic field by a solenoid coil to drive the movable part 15 in the form of a lock pin by an electromagnetic force such that the movable part 15 comes into engagement with an opposing hole ha of the engaged part Hk of the speed reducer 5 to lock the rotation of the middle gear 13 which moves in conjunction with the electric motor 4, and thus to put the parking brake 7 into a parking lock state. Disengagement of the movable part 15 from the hole ha of the engaged part Hk allows the middle gear 13 to rotate and puts the parking brake 7 into an unlocked state (a release state).

In this constitution, in terms of low cost and power saving, the solenoid 16 may preferably include an urging unit (not illustrated) such as a spring for keeping the movable part 15 away from the engaged part Hk, so that the lock can be actuated by generating an electromagnetic force exceeding an urging force of the urging unit by application of an electric current, instead of polarity. It should be noted that, for example, the solenoid 16 may include a field part such as a magnet in the movable part 15 in the form of a lock pin, so that the movable part 15 can be driven in two directions in accordance with a direction of an electric current of the solenoid coil.

Instead of the solenoid 16, a direct-current (DC) motor and a screw mechanism may be provided, so that the engaged part Hk can be locked. The engaged part Hk may preferably be provided in the speed reducer 5 in terms of space saving. For example, the engaged part Hk may be provided in any part which moves in conjunction with the rotation of the motor, such as the rotor of the electric motor 4 or the linear motion mechanism 6.

As a non-illustrated feature, various sensors such as a thermistor may be additionally provided according to requirements.

Constitution of Controller

FIG. 4 is a block diagram of a control system of the electric brake device 1. For example, a controller 2 and a brake actuator BA may be provided for each wheel. Each controller 2 controls a corresponding electric motor 4. Each controller 2 is connected to a direct-current power supply device 3, a brake pedal Bp that is a brake commander, and a parking brake switch Ps that is a parking brake commander. For example, the power supply device 3 may be a low-voltage (for example, 12V) battery or a step-down converter for stepping down a voltage of a high-voltage battery in an electric brake device 1 for an automobile. Alternatively, the power supply device 3 may be a large-capacity capacitor or the like, or a parallel arrangement of such capacitors for redundancy.

The brake pedal Bp gives, to each controller 2, a sensor output which varies according to an operation amount by an operator as a brake command signal (target braking force). It should be noted that the brake commander may be various operation units which can be operated by an operator, such as a control knob, a joystick, and a switch. Alternatively, the brake commander can automatically calculate and output a command value (brake command signal) on the basis of a vehicle state and information from various sensors without relying on an operation of the brake operation unit, as in the case of e.g., autonomous vehicles.

The parking brake switch Ps is a switch which can be operated by an operator and sends, to the controller 2, an instruction to produce or not to produce a parking brake active state where a predetermined braking force is retained using the parking brake 7 without the braking force following a brake command signal given from the brake pedal Bp.

Each controller 2 includes a miscellaneous control calculator for performing control calculation, a motor driver 18, a solenoid driver 19, and an electric current sensor 20. The miscellaneous control calculator includes a braking force estimator 21, a motion state estimation module or a motor motion estimator 22, a control calculator 23, and a parking brake control module 24.

The braking force estimator 21 estimates, on the basis of an output of the load sensor Sb, a brake load which is a load to be applied on an external element by the brake actuator BA. It should be noted that the braking force estimator 21 may perform sensorless estimation without using the load sensor Sb as described above.

The motion state estimation module 22 that is a motor motion estimator estimates a rotary motion state of the electric motor 4 on the basis of an output of the angle sensor Sa. The motion state estimation module 22 includes an angle estimation section 22a which estimates an angle (rotary angle) of the rotor of the electric motor 4 and an angular speed estimation section 22b which estimates an angular speed of the electric motor 4. Alternatively, the motion state estimation module 22 may have, for example, a function of estimating a predetermined differential/integral value of an angular acceleration or the like of the electric motor 4 and a function of estimating disturbances.

The angle estimation section 22a also has a function of, when estimating a rotation angle of the electric motor 4, suitably calculating a necessary physical quantity based on control configuration, such as an electrical angle phase for electric current control and a total rotation angle for angle control with correction of an overlap and an underlap of the angle sensor Sa. Besides, instead of the rotation angle and the angular speed the rotor of the electric motor 4, it is possible to use, for example, an angle of a predetermined part of the speed reducer 5 calculated on the basis of a reduction ratio, or a position and a speed calculated on the basis of an equivalent lead or the like. For example, the physical quantity may be estimated by using a feature of a state estimation observer or the like or be directly obtained by backward calculation based on a differential equation or an inertial equation.

The electric current sensor 20 may be, for example, a sensor constituted by an amplifier for detecting a voltage between opposite ends of a shunt resistor or a non-contact sensor for detecting a magnetic flux or the like around an electric current application path of a phase current of the electric motor 4. As a different constitution, for example, the electric current sensor 20 may detect a terminal voltage of an element constituting the motor driver 18. The electric current sensor 20 may be arranged between phases of the electric motor, or one or more electric current sensors be arranged on a low side or on a high side. Alternatively, the controller 2 can perform feed-forward control based on motor characteristics or the like, such as an inductance or a resistance value of the electric motor 4, without employing any electric current sensor.

The control calculator 23, which is an actuator control module, calculates an operation amount (electric motor operation amount) for controlling the braking force such that the braking force follows a brake command signal given from the brake pedal Bp. That is, the control calculator 23 has a function of calculating an operation amount in order to cause the brake actuator BA to desirably follow a predetermined command input and converting it into a motor drive signal. The control calculator 23 includes a brake load control section 23a for mainly controlling a brake load (braking force) and a motor angle control section 23b for controlling a motor angle, and causes a switchover between the brake load control section 23a and the motor angle control section 23b according to requirements. As a non-illustrated function, the control calculator 23 may preferably include an electric current control module for controlling a motor electric current and have a function of determining a motor electric current for exerting a desirable motor torque based on motor output characteristics, so that highly functional control can be executed.

The parking brake control module 24 has a control calculation function of causing the electric motor 4 and the solenoid 16 to operate in cooperation with each other to cause a shift to the parking brake active state and end the parking brake active state. The parking brake control module 24 includes a lock control section 24a for causing a shift to the parking brake active state and a release control section 24b for ending the parking brake active state. A control switchover signal for causing a switchover between the lock control section 24a and the release control section 24b is outputted from the parking brake control module 24 to the control calculator 23.

In the parking brake active state, the engaged part Hk is in a lock state where the engaged part is locked by e.g., the movable part 15 which is a lock pin of the solenoid 16, and the lock state is maintained by a friction force generated by a reverse input acting on a contact part of the engaged part Hk, with no driving power generated to the electric motor 4 (in other words, without motor power consumption). At this point, the electric motor 4 may be in an unpowered state where no electric current is supplied, or in a state where the electric motor continues to execute control with low power consumption (e.g., with zero torque), or in a combined state thereof.

The lock control section 24a includes a first parking brake (PKB) operator 24aa, a second parking brake (PKB) operator 24ab, and a third parking brake (PKB) operator 24ac. Upon receipt of an instruction to produce the parking brake active state from the parking brake switch Ps while the parking brake is released and not in the parking brake active state, the first PKB operator 24aa exerts a braking force without depending on the brake pedal Bp and determines if the braking force is exerted which exceeds a braking force to be exerted in the parking brake active state at least on the basis of the braking force estimator 21.

After the determination by the first PKB operator 24*aa*, the second PKB operator 24*ab* makes the movable part 15 ready to come into engagement with the engaged part Hk and causes the electric motor 4 to rotate in a direction in which the braking force is decreased at least on the basis of the motion state estimation module 22, so that the movable part 15 comes into engagement with the engaged part Hk to prevent the rotation of the electric motor 4.

After the execution of the second PKB operator 24*ab*, the third PKB operator 24*ac* produces the parking brake active state where no driving power is generated to the electric motor 4.

Basically, these PKB operators are executed in the order of the first PKB operator 24*aa*, the second PKB operator 24*ab*, and the third PKB operator 24*ac*, and the parking brake active state is attained when the third PKB operator 24*ac* completes the execution normally.

The release control section 24*b* includes a first parking brake (PKB) releaser 24*ba* and a second parking brake (PKB) releaser 24*bb*. Upon receipt of an instruction to end the parking brake active state from the parking brake switch Ps when in the parking brake active state, the first PKB releaser 24*ba* makes the movable part 15 ready to be disengaged from the engaged part Hk and causes, from a state at a time of starting parking brake release, the electric motor 4 to rotate in a direction in which the braking force is increased at least on the basis of one or both of the braking force estimator 21 and the motion state estimation module 22, so that the electric motor 4 is rotated such that the movable part 15 can be disengaged. That is, the first PKB releaser 24*ba* causes the electric motor 4 to rotate by a predetermined amount so as to increase the brake load as compared with the brake load during the parking brake active state, so that and the movable part 15 in the form of a lock pin can be disengaged from the engaged part Hk.

After the execution of the first PKB releaser 24*ba*, the second PKB releaser 24*bb* causes the electric motor 4 to rotate at least on the basis of one or both of the braking force estimator 21 and the motion state estimation module 22 and determines that the parking brake release has been completed when a rotation amount of the electric motor 4 exceeds the predetermined amount. That is, the second PKB releaser 24*bb* causes the electric motor 4 to rotate by a predetermined amount so as to reduce the brake load at least below the brake load during the parking brake active state.

Basically, these PKB releaers are executed in the order of the first PKB releaser 24*ba* and the second PKB releaser 24*bb*, and the parking brake release state (i.e., a service brake active state) is attained when the second PKB releaser 24*bb* completes the execution normally.

These different calculation functions may preferably be implemented by computing modules (e.g., microcomputer, FPGA, and ASIC) and peripheral circuits in order to achieve cost savings and high performance.

The motor driver 18 controls electric power to be supplied to the electric motor 4. The motor driver 18, which is a drive circuit, may include, for example, a half-bridge circuit including a switch element such as a field effect transistor (abbreviated as FET) and may be configured to perform PWM control for determining a motor application voltage in accordance with an ON-OFF duty cycle of the switch element in order to achieve cost savings and high performance. Alternatively, the motor driver 18 may be provided with a transformer circuit and be configured to perform PAM control.

The solenoid driver 19 drives and controls the solenoid 16 in accordance with a solenoid ON/OFF signal given from the parking brake control module 24. The solenoid driver 19 may preferably be constituted by, for example, a switch element such as a field effect transistor or a bipolar transistor in terms of cost savings. In a case where a solenoid 16 including a separation spring is used, one such switch element may be provided as a switch for permitting/interrupting an electric current from the power supply device 3 to the solenoid 16, or a switch for permitting/interrupting an electric current from the solenoid 16 to the ground. It is also possible to provide both switches for redundancy. In a case of e.g., a bidirectionally driven solenoid or a bidirectionally driven DC motor, a bridge circuit including at least four switch elements may be provided.

As a non-illustrated feature, it is preferable that the motor driver 18 or the solenoid driver 19 is directly powered by the power supply device 3, and that a compact step-down converter is provided for the miscellaneous control calculator or the like inside the controller 2. Alternatively, it is possible to supply electric power to one or both of the motor driver 18 and the solenoid driver 19 via a step-up converter or boost converter.

Basic Operation Flow of Parking Brake Control Module 24

Figure 5:
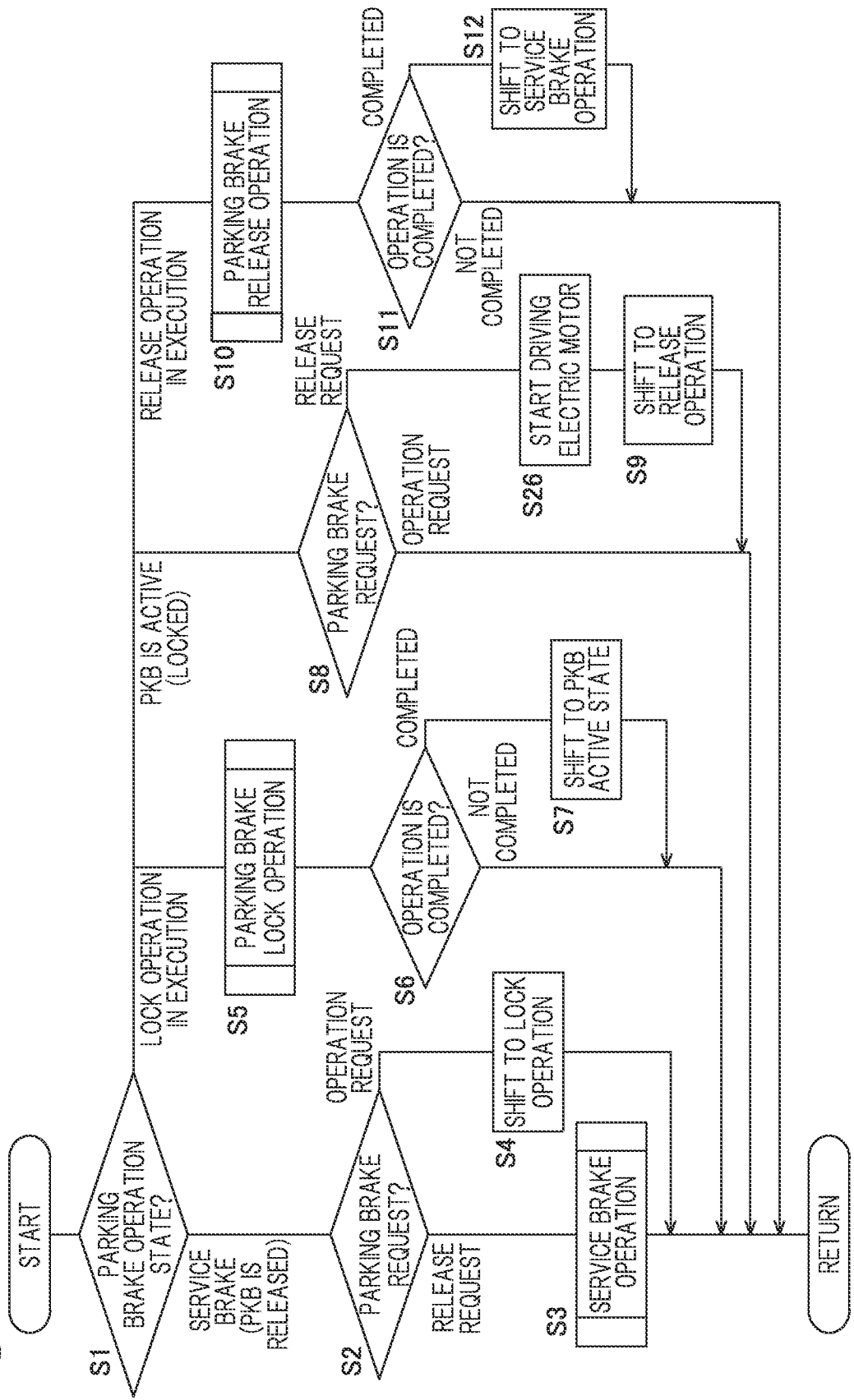
FIG. 5 is a flowchart illustrating a basic operation of a parking brake control module.

FIG. 5 is a flowchart illustrating a basic operation of the parking brake control module 24. Hereinafter, FIG. 4 will also be referred to as needed in the description.

After the process is started, the parking brake control module 24 determines an operation state of the parking brake (step S1). In step S1, if it is determined that the parking brake is released, i.e., the service brake is being used, the parking brake control module 24 determines whether a parking brake command is a parking brake operation request or a parking brake release request (step S2).

For example, the parking brake command may be determined as a parking brake operation request when the parking brake switch Ps is ON, and as a parking brake release request when the parking brake switch Ps is OFF. Alternatively, with a switch having three or more states (for example, for switching among ON1-ON2-OFF), the parking brake command may be determined as a parking brake operation request when the parking brake switch Ps is ON1, as a parking brake release request when the parking brake switch Ps is ON2, and as a request for maintaining the previous state when the parking brake switch Ps is OFF. This also applies when using a command signal from a superordinate ECU as a parking brake commander.

If the command is determined as a parking brake release request in step S2, a service brake active state is attained (step S3). If the command is determined as a parking brake operation request in step S2, the parking brake is shifted to a lock operation state (step S4).

If it is determined that a lock operation is being executed in step S1, the parking brake lock operation is executed (step S5). Next, the parking brake control module 24 determines if the parking brake lock operation has been completed (step S6), and if so, a shift is caused to a parking brake active state (step S7).

If it is determined that the parking brake is in the parking brake active state in step S1, the parking brake control module 24 determines whether a parking brake command is a parking brake operation request or a parking brake release request (step S8). If the command is determined as a parking brake release request, the electric motor 4 which is in a predetermined standby state while the parking brake is used is started to be driven (step S26), and a shift is caused to a release operation state (step S9).

If it is determined that a release operation is being executed in step S1, the release operation is executed (step S10). The parking brake control module 24 determines if the release operation has been completed (step S11), and if so, a shift is caused to a service brake active state (step S12).

Flow of Lock Operation

Figure 6:
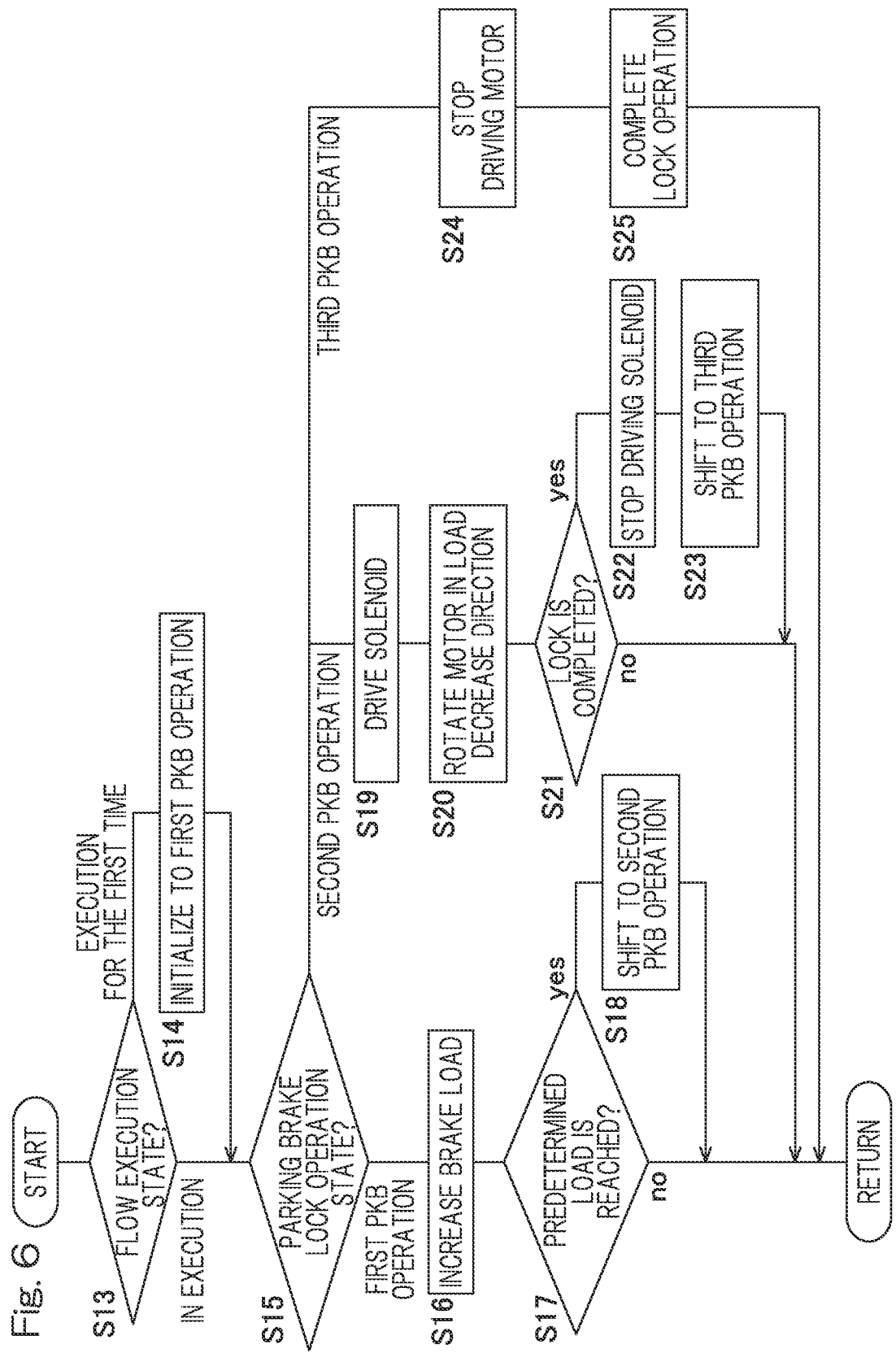
FIG. 6 is a flowchart of a lock operation in step S5 of FIG. 5.

FIG. 6 is a flowchart of a lock operation in step S5 of FIG. 5.

After this process is started, the lock control section 24a determines if this flow is to be executed for the first time (step S13), and if so, a present operation state is initialized to a first PKB operation state (step S14). Execution for the first time means a first instance of execution since the parking brake lock operation is activated from a non-activated state.

Next, a parking brake lock operation state is determined (step S15), and if the parking brake is in the first PKB operation state, the first PKB operator 24aa increases a brake load (step S16). Next, it is determined whether a predetermined brake load is reached (step S17), and if the load is reached (step S17: yes), a shift is caused to a second PKB operation state (step S18). The predetermined brake load may preferably be set to, for example, a brake load obtained by adding, to a target parking brake load, a bias amount in consideration of the influence of e.g., the load retainment precision due to the engagement pitch Pc (FIG. 3) of the holes ha of the engaged part Hk.

If it is determined that the parking brake is in the second PKB operation state in step S15, the second PKB operator 24ab drives the solenoid 16 such that the movable part 15 projects (step S19). FIG. 6 shows an example where the solenoid 16 is used. However, even where a DC motor or the like is used, a similar operation is performed such that the movable part 15 which corresponds to a lock pin is driven so as to approach the engaged part Hk. Where the time required for projection of the movable part 15 is not negligible, a predetermined standby time may be provided, with the solenoid 16 being driven.

The second PKB operator 24ab causes the electric motor 4 to rotate in a load decrease direction with the solenoid 16 being driven (step S20). The electric motor 4 may be rotated through brake load control, motor angle control, or motor angular speed control, or may be rotated by gradually decreasing a motor current so as to receive a brake reaction force. Next, the lock control section 24a determines whether the lock has been completed (step S21), and if the lock has been completed (step S21: yes), stops driving the solenoid 16 (step S22) and causes a shift to a third PKB operation state (step S23).

Determination that the lock has been completed may be made by determining that as the electric motor 4 is caused to rotate in step S20, the lock pin and a hole come into engagement at a point where they have substantially corresponding phases, and then a gap between the pin and the engaged part Hk in a rotation direction is eliminated to prevent the rotation of the electric motor 4. For example, in a case where a disturbance observer or the like is provided, the completion may be determined on the basis of a direction or a magnitude of an estimated disturbance. Specifically, the lock control section 24a has a function of estimating a disturbance torque acting on the electric motor 4 at least on the basis of the motion state estimation module 22, and the lock control section 24a determines that the rotation of the electric motor 4 is prevented due to engagement of the parking brake 7, when the estimated disturbance torque is larger than a predetermined torque and acts in a direction corresponding to a brake load increase direction while the second parking brake operator 24ab is executed.

For example, where the electric motor 4 is caused to rotate through motor angle control or angular speed control in step S20, the determination that the lock has been completed may be made when it is detected that a relatively large motor current occurs in the load decrease direction. Specifically, the lock control section 24a determines that the rotation of the electric motor 4 is prevented by engagement of the parking brake 7, when the estimated electric current of the electric motor 4 is larger than a predetermined electric current and generates a torque in a direction corresponding to a brake load decrease direction while the second PKB operator 24ab is executed. Alternatively, for example, where the rotation is caused by decreasing a motor current so as to receive a brake reaction force in step S20, the determination may be made when it is detected that the electric motor 4 stops rotating.

Where the holes ha of the engaged part Hk have a shape as shown in FIG. 2A which can restrict the motor rotation in both directions, the electric motor 4 may be caused to rotate in the load increase direction in step S20. In such a case, the determination that the lock has been completed may be made by determining that as the electric motor 4 rotates in the load increase direction, the lock pin and a hole ha come into engagement at a point where they have substantially corresponding phases, so that the rotation of the electric motor 4 is prevented, then driving, from that state, the electric motor 4 in the load decrease direction by an angle corresponding to a gap in the hole ha, and determining again that the rotation of the electric motor 4 is prevented. This technique is advantageous, as compared with the technique in which the electric motor 4 is rotated in the load decrease direction in step S20 as described above, in that a brake load exceeding the parking brake load can be retained more reliably, although this technique has a disadvantage that the flow is complicated and requires a longer operation time.

If the third PKB operation state is determined in step S15, the third PKB operator 24ac stops driving the electric motor 4 (step S24) and completes the lock operation (step S25). The electric motor 4 may be stopped by, for example, controlling an operation amount equivalent to a torque (such as line voltage, phase current) to zero, or by interrupting at least one or both of power supply and a circuit drive signal(s) to the motor driver 18, or by shutting down all the functions except for a function(s) necessary for restarting the controller 2.

Where controlling the operation amount to zero, it is possible to readily start driving the motor when a parking brake release request is given afterward. It should be noted that the operation amount of zero may include an operation amount small enough to be considered as substantially zero.

Where one or both of power supply and a circuit drive signal(s) to the electric motor drive circuit are interrupted, it is advantageous in that power consumption can be further reduced while the electric motor 4 is stopped, although it is disadvantageous in that there is a longer time lag before the electric motor 4 is started again.

Where all the functions are shut down except for a function(s) necessary for restarting the controller 2, it is advantageous in that power consumption can be reduced to the lowest while the electric motor 4 is stopped, although it is disadvantageous in that there is a longest time lag before the electric motor 4 is started again.

Flow of Release Operation

Figure 7:
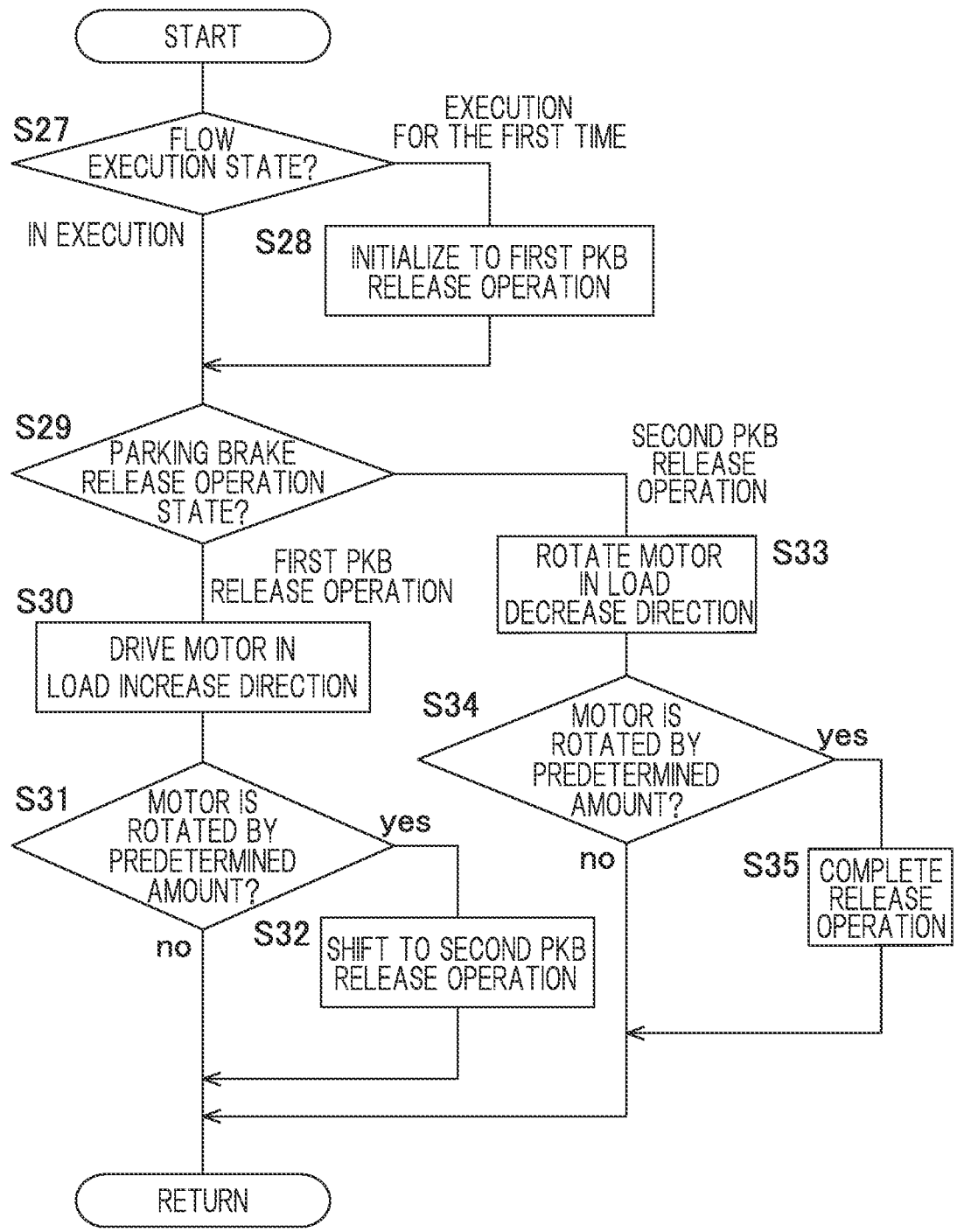
FIG. 7 is a flowchart of a release operation in step S10 of FIG. 5.

FIG. 7 is a flowchart of a release operation in step S10 of FIG. 5.

After this process is started, the release control section 24b determines if this flow is to be executed for the first time (step S27), and if so, a present operation state is initialized to a first PKB release operation state (step S28). Execution for the first time means a first instance of execution since the parking brake release operation is activated from a non-activated state.

Next, a parking brake release operation state is determined (step S29), and if the parking brake is in the first PKB release operation state, the first PKB releaser 24ba causes the electric motor 4 to rotate in the load increase direction (step S30). The electric motor 4 may be rotated through brake load control, motor angle control, or motor angular speed control, or may be rotated by gradually increasing a motor current.

Next, the release control section 24b determines if the electric motor 4 has rotated by a predetermined amount (step S31), and if it is determined so (step S31: yes), a shift is caused to a second PKB release operation state (step S32). The predetermined amount may be set to, for example, such a motor rotation amount that sufficiently dissociates a contact portion of the engaged part Hk which restricts the rotation of the electric motor 4 in engagement of the parking brake 7. When the contact portion is dissociated, the lock pin is disengaged from the engaged part Hk by an urging unit of the solenoid 16.

In this example, the solenoid 16 is a solenoid capable of being driven by a solenoid coil and an urging unit. However, for example, where a bidirectionally driven solenoid or DC motor is used, the lock pin may be driven in a direction which the lock pin is disengaged from the engaged part Hk simultaneously with the rotation of the electric motor 4 in step S30, so that the lock pin can be disengaged from the engaged part Hk. Where the time required for projection of the lock pin or the movable part 15 which corresponds to the lock pin is not negligible, a predetermined standby time may be provided for disengaging the movable part 15 of the solenoid 16.

If it is determined that the parking brake is in the second PKB release operation state in step S29, the second PKB releaser 24bb causes the electric motor 4 to rotate in the load decrease direction (step S33). The electric motor 4 may be rotated through brake load control, motor angle control, or motor angular speed control, or may be rotated by gradually decreasing a motor current so as to receive a brake reaction force. Next, it is determined if the electric motor 4 has rotated by a predetermined amount (step S34), and if it is determined so (step S34: yes), the release operation is completed (step S35).

The predetermined amount may preferably be set, for example, in order to determine if the electric motor 4 has rotated in the load decrease direction at least further than an angle at which the electric motor 4 is locked before starting the parking brake release operation, with the angle stored in advance, so that it is possible to reliably determine that the movable part 15 is disengaged from the engaged part Hk.

It should be noted that the "start" and "return" in FIG. 5 to FIG. 7 are indicated only for explanatory convenience, and the flows from the start to the return in the respective flowcharts do not necessarily occur in a synchronized manner in a control cycle. Further, as long as no contradiction occurs in the operations as described in the present embodiment, suitable modifications may be made to the order of calculations or the ways of determinations depending on requirements for implementation or the like.

Figure 8:
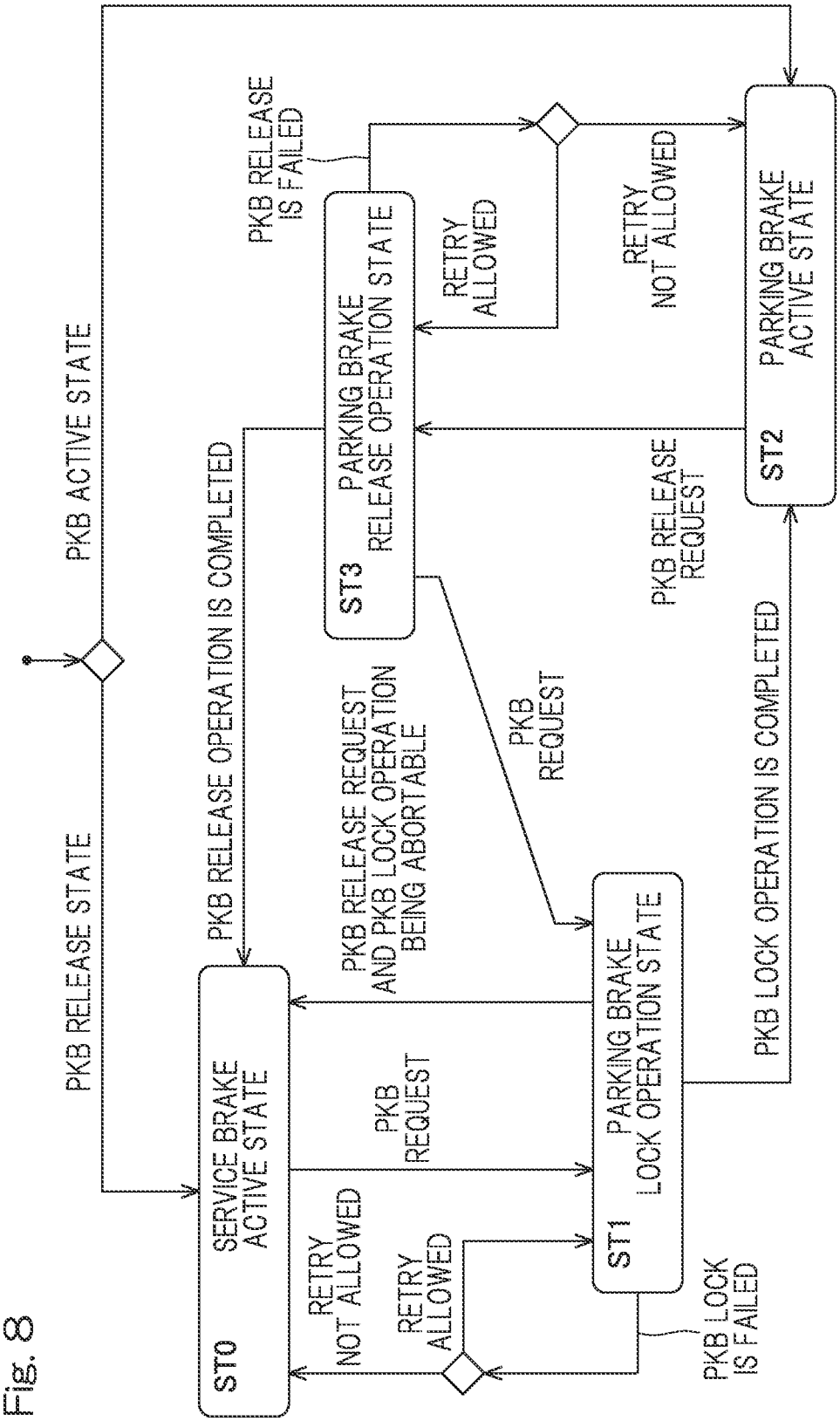
FIG. 8 illustrates state transitions by the parking brake control module.

FIG. 8 illustrates state transitions by the parking brake control module 24.

If an initial state is the parking brake release state, a transition is caused to state ST0, and if the initial state is the parking brake active state, a transition is caused to state ST2. Whether or not it is the parking brake active state may, for example, be determined on the basis of a state stored in a non-volatile storage device (not illustrated) which is provided in the controller 2 and stores an instance(s) of whether or not a vehicle operation is finished in the parking brake active state. Alternatively, the initial state may be given from a superordinate ECU or the like of the vehicle. Besides, it is possible to determine whether the parking brake is in the lock state or not by the procedure as described with reference to FIG. 6, and then to determine whether it is in the parking brake active state on the basis of the determination of whether it is in the lock state or not.

As shown in FIG. 8, when a parking brake request is given, a transition is caused from the service brake active state (ST0) to the parking brake lock operation state (ST1). Once the lock operation has been completed, a transition is caused from the parking brake lock operation state (ST1) to the parking brake active state (ST2). When a parking brake release request is given during the lock operation, and if the lock operation can be aborted, a transition is caused to the service brake active state (ST0). Specifically, when the controller 2 receives an instruction to end the parking brake active state from the parking brake switch Ps while the first PKB operator 24aa is executed, the controller 2 start, from a state where a braking force is exerted without depending on the brake pedal Bp, controlling a braking force such that the braking force follows a target braking force given from the brake pedal Bp. The lock operation can be aborted, for example, when the solenoid 16 is not driven.

Where the lock operation from the parking brake lock operation state (ST1) is failed, a transition is caused again to the parking brake lock operation state (ST1) if a retry is allowed. Specifically, when the electric motor 4 has rotated beyond the engagement pitch Pc (FIG. 3) at least on the basis of the motion state estimation module 22 while the second PKB operator 24ab is executed, the controller 2 determines that engagement of the parking brake 7 is failed and executes the first and second parking brake operations one or more times again.

If a retry is not allowed, a transition is caused to the service brake active state (ST0). Failure of the lock operation may be determined, for example, when the electric motor 4 has rotated more than a predetermined amount in the load decrease direction without being locked while the second PKB operation (FIG. 6) is executed. The predetermined amount may be defined on the basis of, for example, the engagement pitch of the engaged part Hk or the like. To determine whether or not a retry is allowed, for example, the controller 2 may have a function of storing the number of retries, and a retry may be refused when the number of retries exceeds a predetermined value. There may be a function of indicating abnormality in the parking brake operation when it is determined that a retry is not allowed to an operator of the vehicle through a unit such as a lamp.

When a parking brake release request is given, a transition is caused from the parking brake active state (ST2) to the parking brake release operation state (ST3). Once the release operation has been completed, a transition is caused from the parking brake release operation state (ST3) to the service brake active state (ST0). If a parking brake request is given when in the parking brake release operation state (ST3), a transition is caused to the parking brake lock operation state (ST1).

If the release operation is failed when in the parking brake release operation state (ST3), a transition is caused again to the parking brake release operation state (ST3) if a retry is allowed. Specifically, when it is determined that the rotation of the electric motor 4 is prevented by the parking brake 7 at least on the basis of the motion state estimation module 22 while the second PKB releaser 24bb is executed, the controller 2 determines that release of the parking brake is failed and executes the first PKB releaser 24ba one or more times again.

If a retry is not allowed, a transition is caused to the parking brake active state (ST2). Failure of the release operation may be determined, for example, when the electric motor 4 is locked while the second PKB release operation (FIG. 7) is executed. To determine whether or not a retry is allowed, for example, the controller 2 may have a function of storing the number of retries, and a retry may be refused when the number of retries exceeds a predetermined value. There may be a function of indicating abnormality in the parking brake operation when it is determined that a retry is not allowed to an operator of the vehicle through a unit such as a lamp.

Exemplary Operation of Parking Brake 7

Figure 9:
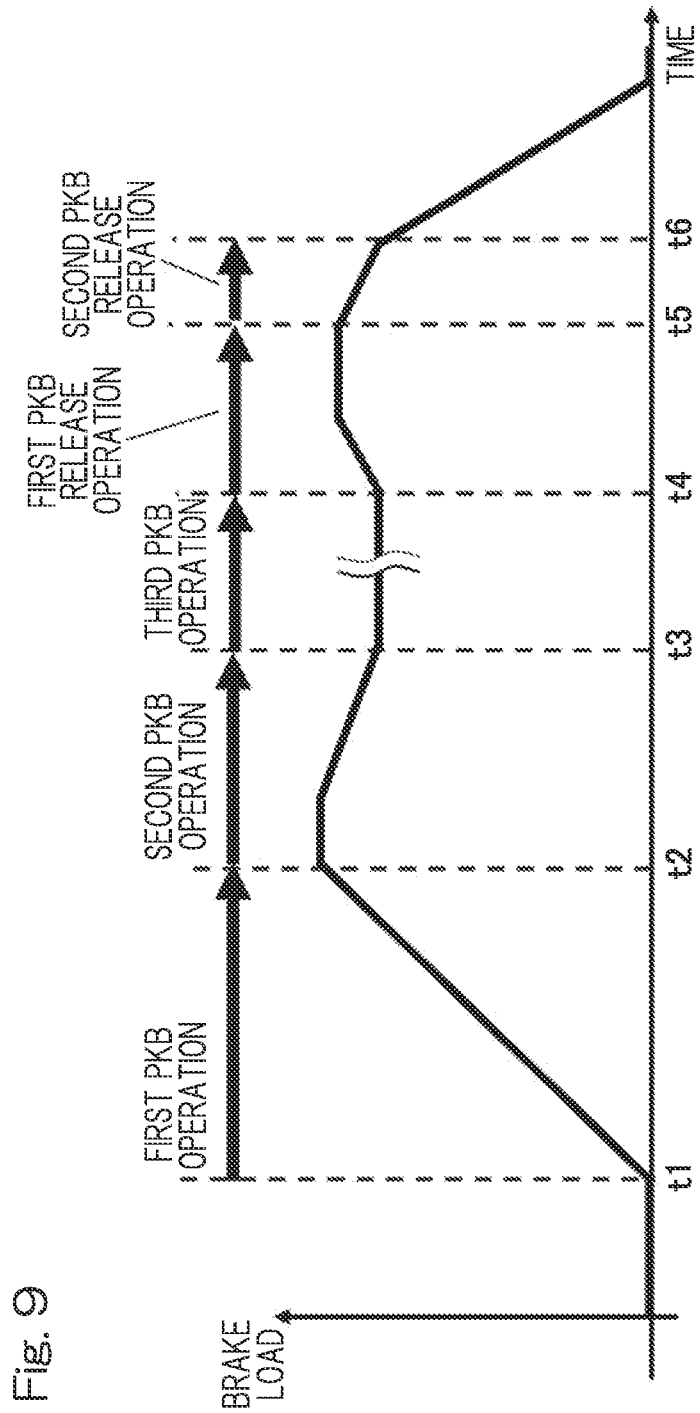
FIG. 9 illustrates an exemplary operation of the parking brake.

FIG. 9 illustrates an exemplary operation of the electric brake device.

At time t1, when a first PKB operation is started, the brake load is increased to a predetermined brake load. At time t2, when the predetermined brake load is reached, a shift is caused the second PKB operation state. Next, with the solenoid 16 being driven, the electric motor 4 is rotated in the load decrease direction. When the engaged part Hk and the movable part 15 of the solenoid 16 come into a predetermined positional relation where they come into engagement with each other, the engaged part Hk is locked by the solenoid 16, so that the rotation of the electric motor 4 is prevented (at time t3). Then, the electric motor 4 is stopped, and the lock operation is completed (from time t3 to t4).

From time t4, the release operation is started, and after the electric motor 4 is caused to rotate by a predetermined amount in a direction in which the brake load is increased, the angle of the electric motor is maintained substantially constant until the movable part 15 of the solenoid 16 is surely disengaged. Then, the electric motor 4 is caused to rotate in the load decrease direction from time t5, and once it is confirmed that the lock is released because the electric motor 4 has rotated by the predetermined amount at time t6, the release operation is completed.

Effects and Advantages

According to the above-described electric brake device 1, the controller 2 controls the braking force such that the braking force follows a target braking force given from the brake pedal Bp while the parking brake is released.

When the parking brake switch Ps gives an instruction to produce the parking brake active state to the controller 2, the first parking brake operator 24aa, the second parking brake operator 24ab, and the third parking brake operator 24ac are executed sequentially.

First, upon receipt of an instruction to produce the parking brake active state is given while the parking brake is released, the first PKB operator 24aa exerts the braking force without depending on the brake pedal Bp. The first PKB operator 24aa further determines if the braking force is exerted which exceeds a braking force to be exerted in the parking brake active state.

After this determination, the second PKB operator 24ab makes the movable part 15 ready to come into engagement with the engaged part Hk and causes the electric motor 4 to rotate in a direction in which the braking force is decreased. Thus, a so-called lock state is attained where the engaged part Hk and the movable part 15 are engaged with each other.

Then, the third PKB operator 24ac produces the parking brake active state where no driving power is generated to the electric motor 4.

Thus, when shifting to the parking brake active state, an operation of exerting a braking force equivalent to the parking brake, an operation of locking the parking brake 7, and an operation of maintaining the parking brake active state while suppressing power consumption of the electric motor 4 are performed sequentially, so that the parking brake operation can be precisely performed with reduced malfunction.

Further, the release control section 24b of the parking brake control module 24 sequentially performs, from the parking brake active state, an operation of rotating the electric motor 4 in the load increase direction to disengage the movable part 15 from the engaged part Hk and an operation of decreasing the pressure to release the parking brake load, so that the parking brake release operation can be precisely performed with reduced malfunction.

Other Embodiments

Next, other embodiments will be described. In the following description, the same reference numerals are used to denote parts that correspond to those previously described in the respective embodiments, and overlapping description is omitted. Where only a part of a configuration is described, the rest of the configuration is to be construed as being the same as the previously described embodiments unless otherwise indicated. The same configurations provide the same effects. It is possible not only to combine the parts that have been particularly described in the respective embodiments but also to partly combine the embodiments unless there is any hindrance to such a combination.

Figure 10:
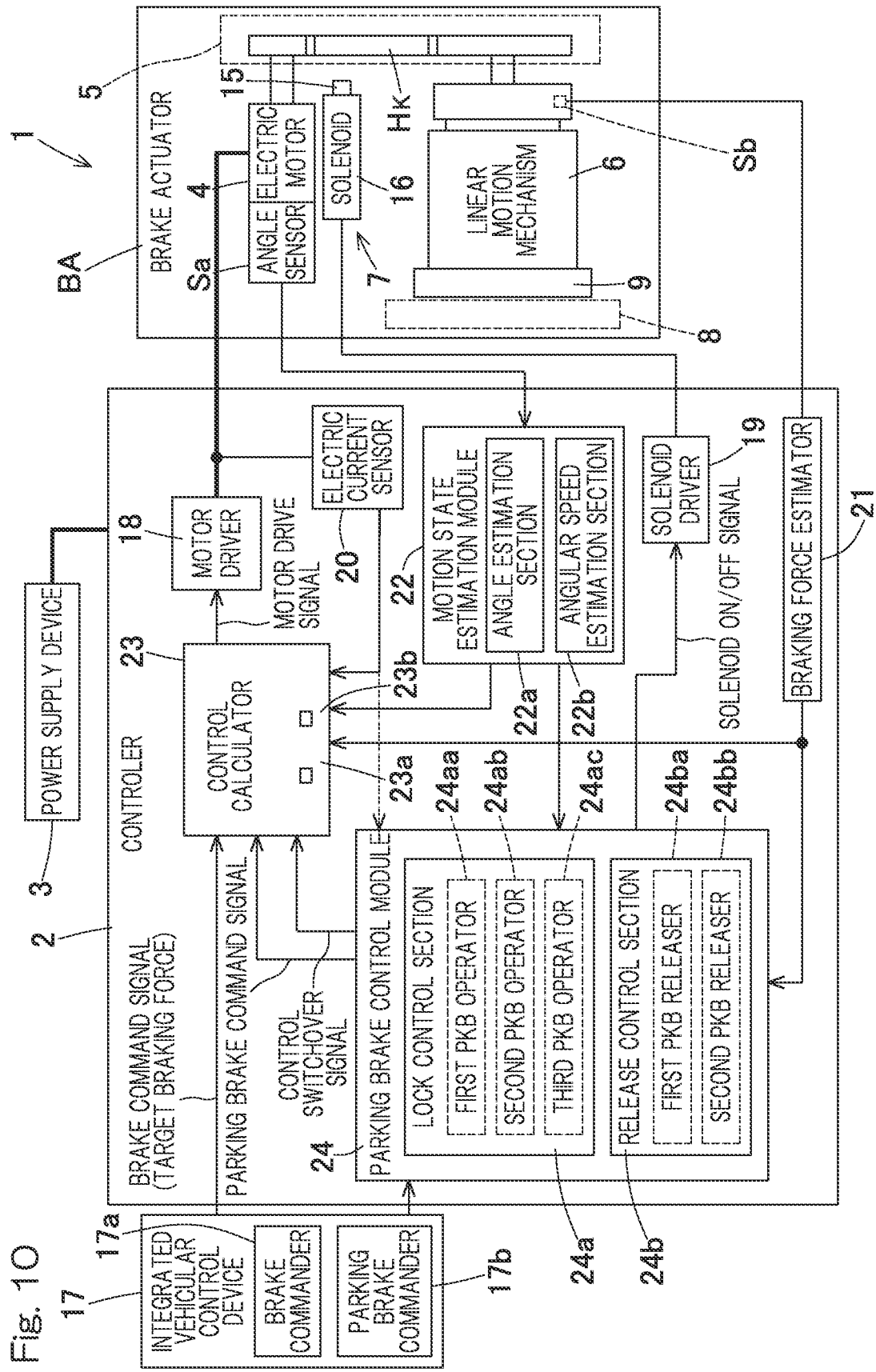
FIG. 10 is a block diagram of a control system of an electric brake device according to another embodiment of the present invention.

FIG. 10 shows an example where e.g., a superordinate ECU 17 of an integrated vehicular controller (vehicle control unit, VCU) which controls the whole vehicle includes a brake commander 17a and a parking brake commander 17b. The brake commander 17a of the superordinate ECU 17 sends a brake command signal which indicate a target braking force to the controller 2, and the parking brake commander 17b sends an instruction to produce or not to produce the parking brake active state to the controller 2. The superordinate ECU 17 may have a function of generating a brake command signal on the basis of an operation state of the brake pedal or the like or a function of generating a command signal which does not depend on an operator, such as automatic braking and automatic driving.

The configurations in FIG. 4 and FIG. 10 may be used in combination. For example, the brake commander 17a may operate on the basis of an operation of the brake pedal Bp, and the parking brake commander 17b may be a command signal from the superordinate ECU 17. Reversely, the brake commander 17a may be a command signal from the superordinate ECU 17, and the parking brake commander 17b may be the parking brake switch Ps or the like.

As indicated with the imaginary lines in FIG. 4 and FIG. 10, the parking brake control module 24 may receive an output of the electric current sensor 20. The value from the electric current sensor may be used to determine whether the electric motor 4 is locked or not in the parking brake operation as described above.

In addition, the functional blocks shown in FIG. 4 and FIG. 10 are provided only for the sake of illustration and are not intended to limit configurations or partitions of hardware and software, or the like. As long as the functions as shown in FIG. 4 and FIG. 10 are not impaired, the specific configurations of hardware and software may be arbitrarily set up and the functions of the respective blocks in these figures may be combined or divided as needed. Alternatively, a non-illustrated element may be added as long as the functions as shown in these figures are not impaired. For example, it is possible to suitably include additional control such as anti-skid control of the electric brake device, pad clearance control during brake release, and side slip prevention control and other safety mechanisms, depending on system requirements.

Other Exemplary Configuration of Engaged Part Hk

FIG. 11A is a front view of another first toothed part 13a; FIG. 11B is a cross-sectional view along line XI(b)-XI(b) in FIG. 11A; FIG. 11C is a cross-sectional view along line XI(c)-XI(c) in FIG. 11A. In FIG. 11A to FIG. 11C, the engaged part Hk includes through holes ha, each through hole having an elongated hole shape in the circumferential direction and including an inclined surface 34 which allows the engaging part to be locked only in one rotation direction and allows the lock to be released in another rotation direction which is opposite to the one rotation direction.

The inclined surface 34 is angled at a predetermined angle with respect to a direction in which the engaging part is driven and is inclined at such an angle that the through hole ha narrows down in the circumferential direction as it extends in a projection direction of the engaging part. The inclined surface 34 is also curved along the shape of an outer peripheral surface of the engaging part. The first toothed part 13a may be rotated in the other rotation direction by driving the electric motor while the lock is released, so that a tip end portion of the engaging part can be contracted along the inclined surface 34 to release the lock. The second toothed part 13b has such an outermost diametric dimension that the second toothed part is located radially inside of the through holes ha.

Although the hole shape is relatively complicated, the example in FIG. 11C makes it possible to perform the operation more reliably than the exemplary configuration in FIG. 2A to FIG. 2C because, for example, where it is necessary to hold a reverse input only in one direction as in the parking brake of the electric brake device, the engagement of the engaging part can be released by rotating the electric motor in the opposite direction to the direction in which the reverse input is held.

FIG. 12A is a front view of another first toothed part 13a; FIG. 12B is a cross-sectional view along line XII(b)-XII(b) in FIG. 12A; and FIG. 12C is a cross-sectional view along line XII(c)-XII(c) in FIG. 12A. FIG. 12A to FIG. 12C show an example where the engaged part Hk includes grooves mz at equal intervals in the circumferential direction, the grooves extending in a radial direction and allowing the movable part to be engaged with or disengaged from the grooves. The example in FIG. 12A to FIG. 12C is advantageous in that the holes have a simple shape and contribute to reduced processing costs, and is preferable in that even where there is a relatively small difference between an outer diametric dimension of the first toothed part 13a and an outer diametric dimension of the second toothed part 13b, the first and second toothed parts 13a, 13b can be integrated to form a single member because the respective grooves mz do not penetrate the first toothed part 13a.

Figure 13A:
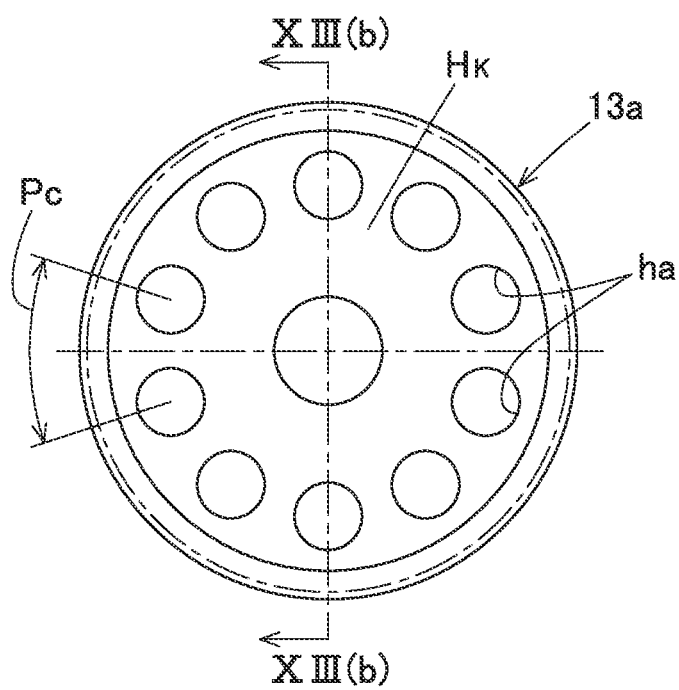
FIG. 13A shows a further exemplary configuration of the engaged part.
Figure 13B:
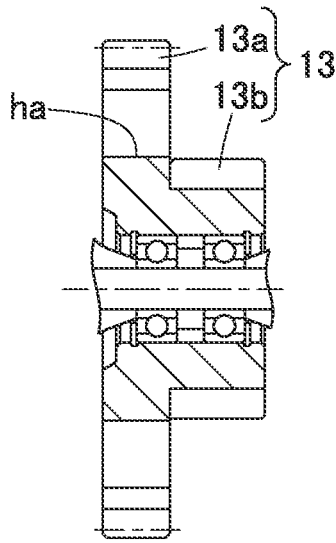
FIG. 13B shows a further exemplary configuration of the engaged part.

FIG. 13A is a front view of another first toothed part 13a; and FIG. 13B is a cross-sectional view along line XIII(b)-XIII(b) in FIG. 13A. In FIG. 13A and FIG. 13B, the engaged part Hk includes a plurality of (10 in this example) through holes ha at equal intervals in the circumferential direction, the through holes allowing the movable part to be engaged with or disengaged from the through holes. Each of the through holes ha has a simple round hole shape. In addition, the second toothed part 13b has such an outermost diametric dimension that the second toothed part is located radially inside of the through holes ha.

The example in FIG. 13A and FIG. 13B is advantageous in that the holes have a simple shape contribute to reduced processing costs, and many holes can be arranged with a relatively pitch Pc, so that a load can be more precisely retained against a reverse input.

Figure 14A:
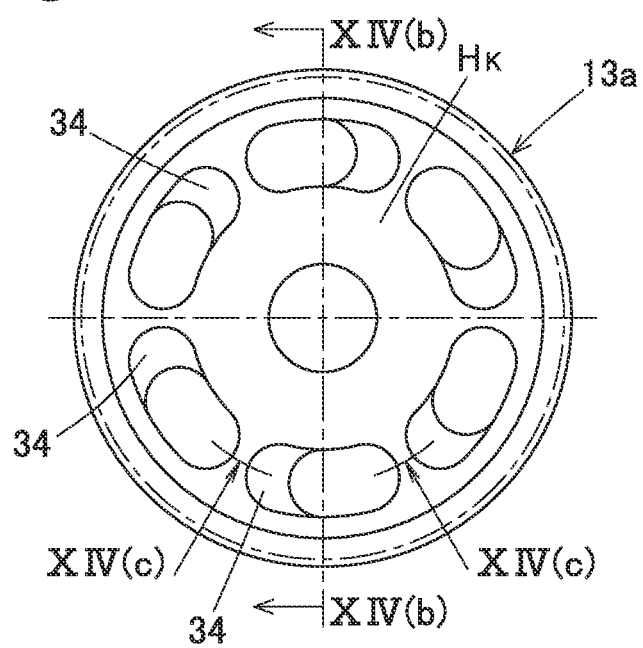
FIG. 14A shows a still further exemplary configuration of the engaged part.
Figure 14B:
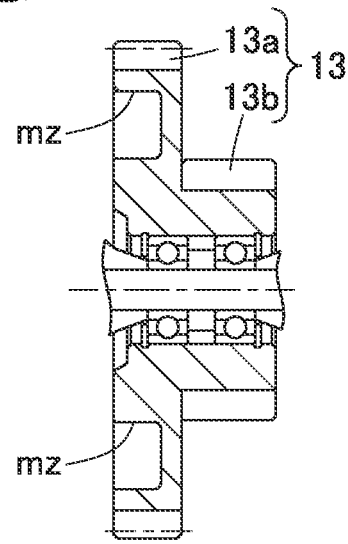
FIG. 14B shows a still further exemplary configuration of the engaged part.
Figure 14C:
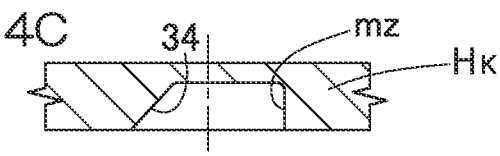
FIG. 14C shows a still further exemplary configuration of the engaged part.

FIG. 14A is a front view of another first toothed part 13a; FIG. 14B is a cross-sectional view along line XIV(b)-XIV(b) in FIG. 14A; and FIG. 14C is a cross-sectional view along line XIV(c)-XIV(c) in FIG. 14A. In FIG. 14A to FIG. 14C, as with FIG. 11A to FIG. 11C, the engaged part Hk includes grooves mz, each of which has an elongated hole shape in the circumferential direction and includes an inclined surface 34 which allows the engaging part to be locked only in one rotation direction and allows the lock to be released in another rotation direction which is opposite to the one rotation direction.

Although the hole shape is relatively complicated, the example in FIG. 14A to FIG. 14C makes it possible to perform the operation more reliably than the exemplary configuration in FIG. 2A to FIG. 2C because, for example, where it is necessary to hold a reverse input only in one direction as in the parking brake of the electric brake device, the engagement of the engaging part can be released by rotating the electric motor in the opposite direction to the direction in which the reverse input is held. In addition, this example is preferable in that the first and second toothed parts 13a, 13b can be integrated to form a single member because the respective grooves mz do not penetrate the first toothed part 13a.

Figure 15A:
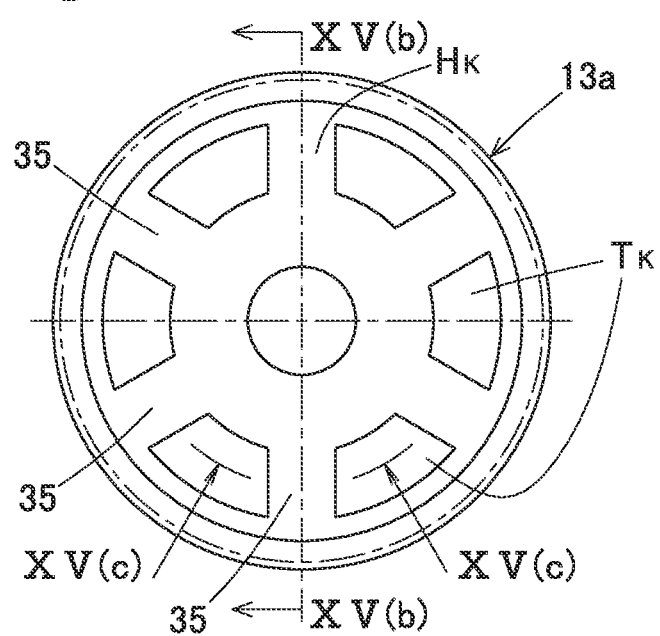
FIG. 15A shows a yet further exemplary configuration of the engaged part.
Figure 15B:
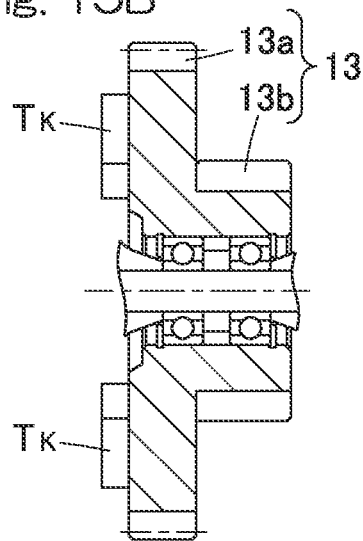
FIG. 15B shows a yet further exemplary configuration of the engaged part.
Figure 15C:
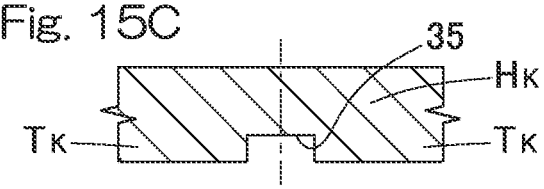
FIG. 15C shows a yet further exemplary configuration of the engaged part.

FIG. 15A is a front view of another first toothed part 13a; FIG. 15B is a cross-sectional view along line XV(b)-XV(b) in FIG. 15A; and FIG. 15C is a cross-sectional view along line XV(c)-XV(c) in FIG. 15A. FIG. 15A to FIG. 15C show an example where the first toothed part 13a includes a plurality of protruding portions Tk at equal intervals in the circumferential direction on an end face of the first toothed part. The movable part can be engaged into or disengaged from a groove portion 35 between adjacent protruding portions Tk, Tk in the circumferential direction. In this example, the respective protruding portions Tk are integrated with the first toothed part 13a. However, they may be constructed as separate members from the first toothed part 13a and be fixed thereto.

The example in FIG. 15A to FIG. 15C is preferable in that this example is excellent in terms of processing costs because it is only necessary to provide the protruding portions Tk on the end face and in that this example has relatively high flexibility in the shape of the protruding portions Tk.

The above embodiments show examples where the engagement holes ha are located on an end face of the gear. However, the engagement holes ha may be provided on a member other than the gear as long as the engagement holes ha can be provided thereon. For example, the engagement holes may be provided on an end face of a rotation shaft of the electric motor, and the solenoid may be disposed so as to face the holes.

As the electric motor 4, for example, it is possible to use a DC motor with brushes, a reluctance motor without a permanent magnet, an induction motor, or the like.

As the speed reducer 5, for example, it is possible to use planetary gears, worm gears, harmonic speed reducers, or the like.

As the linear motion mechanism 6, for example, it is possible to use various mechanisms for converting rotary motion into linear motion by inclination in a circumferential direction of a rotation shaft, such as various screw mechanisms (e.g., planetary roller screws and ball screws), ball lamps, or the like.

Although the present invention has been described in terms of the preferred embodiments thereof with reference to the drawings, various additions, modifications, or deletions may be made without departing from the scope of the invention. Accordingly, such variants are included within the scope of the present invention.

REFERENCE NUMERALS

2 . . . controller
4 . . . electric motor
6 . . . linear motion mechanism (friction member operator)
7 . . . parking brake
8 . . . brake rotor
9 . . . friction member
15 . . . movable part
18 . . . motor driver (drive circuit)
22 . . . motion state estimation module (motor motion estimator)
23 . . . control calculator
24aa . . . first parking brake operator
24ab . . . second parking brake operator
24ac . . . third parking brake operator
24ba . . . first parking brake releaser
24bb . . . second parking brake releaser
Bp . . . brake pedal (brake commander)
Hk . . . engaged part
Ps . . . parking brake switch (parking brake commander)

What is claimed is:
1. An electric brake device comprising:
a brake rotor;
a friction member configured to come into contact with the brake rotor to generate a braking force;
an electric motor;
a friction member operator configured to operate the friction member by the electric motor; and
a controller including a control calculator configured to calculate an electric motor operation amount which is used to control the braking force such that the braking force follows a target braking force given from a brake commander and a drive circuit configured to drive the electric motor,
wherein the electric brake device further includes:
a parking brake including an engaged part configured to move in conjunction with rotation of the electric motor and a movable part configured to move to come into engagement with and disengagement from the engaged part, the parking brake being configured to bring the movable part into engagement with the engaged part to prevent movement in conjunction with the rotation of the electric motor and retain the braking force generated by contact between the brake rotor and the friction member without using a driving force of the electric motor; and
a parking brake commander configured to send, to the controller, an instruction to produce or not to produce a parking brake active state where a predetermined braking force is retained using the parking brake without the braking force following a command value given from the brake commander,
the controller includes
a braking force estimator configured to estimate the braking force, and
an angular speed estimation section configured to estimate an angular speed of the electric motor or an angle estimation section configured to estimate an angle of a rotor of the electric motor and configured to estimate an electric motor motion state including at least one of an angle of the electric motor, a differential/integral value of the angle, and a motion amount which is equivalent to the angle or the differential/integral value of the angle, and
the controller is configured to:
upon receipt of an instruction to produce the parking brake active state from the parking brake commander while a parking brake is released and not in the parking brake active state, exert the braking force without depending on the brake commander and determine whether the braking force is exerted which exceeds a braking force to be exerted in the parking brake active state at least based on the braking force estimator;
upon determining the braking force is exerted which exceeds the braking force, make the movable part ready to come into engagement with the engaged part and cause the electric motor to rotate in a direction in which the braking force is decreased at least based on the angular speed estimation section or the angle estimation section by decreasing a current of the electric motor so as to receive a brake reaction force, so that the movable part comes into engagement with the engaged part to prevent the rotation of the electric motor; and
after producing a state where the rotation of the electric motor is prevented, produce the parking brake active state where no driving power is generated to the electric motor,
wherein the controller includes:
a first parking brake releaser configured to, upon receipt of an instruction to end the parking brake active state from the parking brake commander when in the parking brake active state, make the movable part ready to be disengaged from the engaged part and causes, from a state at a time of starting parking brake release, the electric motor to rotate in a direction in which the braking force is increased at least based on one or both of the braking force estimator, and the angular speed estimation section or the angle estimation section, so that the electric motor is rotated such that the movable part is enabled to be disengaged; and
a second parking brake releaser configured to, after execution of the first parking brake releaser, cause the electric motor to rotate at least based on one or both of the braking force estimator, and the angular speed estimation section or the angle estimation section and determine that the parking brake release has been completed when a rotation amount of the electric motor exceeds a predetermined amount, wherein the controller is configured to determine if the rotation of the electric motor is prevented by the parking brake at least based on the angular speed estimation section or the angle estimation section while the second parking brake releaser is executed, and to determine that the parking brake release has failed when the rotation of the electric motor is prevented, and further execute the first parking brake releaser one or more times again.

2. The electric brake device as claimed in claim 1, wherein the controller includes:

a first parking brake releaser configured to, upon receipt of an instruction to end the parking brake active state from the parking brake commander when in the parking brake active state, make the movable part ready to be disengaged from the engaged part and causes, from a state at a time of starting parking brake release, the electric motor to rotate in a direction in which the braking force is increased at least based on one or both of the braking force estimator and the angular speed estimation section or the angle estimation section, so that the electric motor is rotated such that the movable part is enabled to be disengaged; and a second parking brake releaser configured to, after execution of the first parking brake releaser, cause the electric motor to rotate at least based on one or both of the braking force estimator and the angular speed estimation section or the angle estimation section and determine that the parking brake release has been completed when a rotation amount of the electric motor exceeds a predetermined amount.

3. The electric brake device as claimed in claim 1, wherein the controller is configured to, upon receipt of an instruction to end the parking brake active state from the parking brake commander based on determining that the braking force is exerted which exceeds a braking force to be exerted in the parking brake active state, control the braking force such that the braking force follows a target braking force given from the brake commander, from a state where the braking force is exerted without depending on the brake commander.

4. The electric brake device as claimed in claim 1, wherein the controller has a function of estimating a disturbance torque acting on the electric motor at least based on the angular speed estimation section or the angle estimation section, and the controller is configured to determine that the rotation of the electric motor is prevented by engagement of the parking brake when the estimated disturbance torque is larger than a predetermined torque and acts in a direction corresponding to a brake load increase direction when the electric motor is caused to rotate in a direction in which the braking force is decreased.

5. The electric brake device as claimed in claim 1, wherein the controller has a function of estimating an electric current of the electric motor, and the controller is configured to determine that the rotation of the electric motor is prevented by engagement of the parking brake when the estimated electric current is larger than a predetermined electric current and generates a torque in a direction corresponding to a brake load decrease direction when the electric motor is caused to rotate in a direction in which the braking force is decreased.

6. The electric brake device as claimed in claim 1, wherein the engaged part has an engagement pitch Pc which is set such that the engaged part and the movable part come into a positional relation where the engaged part and the movable part are enabled to be engaged with each other every time the electric motor rotates by a predetermined angle, and the controller is configured to determine that the parking brake has failed to attain engagement when the electric motor has rotated more than the engagement pitch at least based on the angular speed estimation section or the angle estimation section when the electric motor is caused to rotate in a direction in which the braking force is decreased, and execute an operation to determine if the braking force is exerted which exceeds a braking force to be exerted in the parking brake active state and an operation to cause the electric motor to rotate in a direction in which the braking force is decreased, one or more times again.

* * * * *